US012462831B2

(12) United States Patent
Topchy et al.

(10) Patent No.: US 12,462,831 B2
(45) Date of Patent: *Nov. 4, 2025

(54) METHODS AND APPARATUS TO FINGERPRINT AN AUDIO SIGNAL

(71) Applicant: Gracenote, Inc., Emeryville, CA (US)

(72) Inventors: Alexander Topchy, New Port Richey, FL (US); Christen V. Nielsen, Dunedin, FL (US); Jeremey M. Davis, New Port Richey, FL (US)

(73) Assignee: Gracenote, Inc., New York, NY (US)

(*) Notice: Subject to any disclaimer, the term of this patent is extended or adjusted under 35 U.S.C. 154(b) by 297 days.

This patent is subject to a terminal disclaimer.

(21) Appl. No.: 18/547,790

(22) PCT Filed: Feb. 7, 2022

(86) PCT No.: PCT/US2022/015442
§ 371 (c)(1),
(2) Date: Aug. 24, 2023

(87) PCT Pub. No.: WO2022/186952
PCT Pub. Date: Sep. 9, 2022

(65) Prior Publication Data

US 2024/0242730 A1 Jul. 18, 2024

Related U.S. Application Data

(63) Continuation of application No. 17/192,592, filed on Mar. 4, 2021, now Pat. No. 11,798,577.

(51) Int. Cl.
*G10L 25/51* (2013.01)
*G11B 27/28* (2006.01)

(52) U.S. Cl.
CPC .............. *G10L 25/51* (2013.01); *G11B 27/28* (2013.01)

(58) Field of Classification Search
CPC ......... G10L 25/51; G10L 25/48; G10L 25/54; G10L 19/018; G10L 25/18
See application file for complete search history.

(56) References Cited

U.S. PATENT DOCUMENTS 9,202,472 B1 * 12/2015 Sharifi .................. G10L 19/018
9,299,350 B1 * 3/2016 Dumont .................. G10L 17/06
(Continued)

OTHER PUBLICATIONS

B. Coover and J. Han, "A Power Mask based audio fingerprint," 2014 IEEE International Conference on Acoustics, Speech and Signal Processing (ICASSP), 2014, pp. 1394-1398, doi: 10.1109/ICASSP.2014.6853826. (Year: 2014).*
(Continued)

*Primary Examiner* — Richemond Dorvil
*Assistant Examiner* — Alexander G Marlow
(74) *Attorney, Agent, or Firm* — McDonnell Boehnen Hulbert & Berghoff LLP

(57) ABSTRACT

Methods, apparatus, systems, and articles of manufacture to fingerprint an audio signal. An example apparatus disclosed herein includes an audio segmenter to divide an audio signal into a plurality of audio segments, a bin normalizer to normalize the second audio segment to thereby create a first normalized audio segment, a subfingerprint generator to generate a first subfingerprint from the first normalized audio segment, the first subfingerprint including a first portion corresponding to a location of an energy extremum in the normalized second audio segment, a portion strength evaluator to determine a likelihood of the first portion to change, and a portion replacer to, in response to determining the likelihood does not satisfy a threshold, replace the first portion with a second portion to thereby generate a second subfingerprint.

20 Claims, 11 Drawing Sheets

(56) References Cited

U.S. PATENT DOCUMENTS

| | | | | |
|---|---|---|---|---|
| 2011/0307085 | A1* | 12/2011 | Selby | G10L 25/18 700/94 |
| 2013/0279740 | A1* | 10/2013 | Bauer | G06V 10/809 382/100 |

OTHER PUBLICATIONS

L. Ondel, X. Anguera and J. Luque, "MASK+: Data-driven regions selection for acoustic fingerprinting," 2015 IEEE International Conference on Acoustics, Speech and Signal Processing (ICASSP), 2015, pp. 335-339, doi: 10.1109/ICASSP.2015.7177986. (Year: 2015).*

X. Anguera, A. Garzon and T. Adamek, "MASK: Robust Local Features for Audio Fingerprinting," 2012 IEEE International Conference on Multimedia and Expo, 2012, pp. 455-460, doi: 10.1109/ICME.2012.137. (Year: 2012).*

S. Yao, B. Niu and J. Liu, "Audio Identification by Sampling Sub-fingerprints and Counting Matches," in IEEE Transactions on Multimedia, vol. 19, No. 9, pp. 1984-1995, Sep. 2017, doi: 10.1109/TMM.2017.2723846. (Year: 2017).*

Haitsma, Kalker "A Highly Robust Audio Fingerprinting System" Retrieved from https://ismir2002.ismir.net/proceedings/02-FP04-2.pdf (Year: 2002).*

* cited by examiner

METHODS AND APPARATUS TO FINGERPRINT AN AUDIO SIGNAL

This application is a U.S. National Stage under 35 U.S.C. § 371 of International Application No. PCT/US2022/015442, filed Feb. 7, 2022, which is a continuation of U.S. application Ser. No. 17/192,592, filed Mar. 4, 2021, all of which are incorporated by reference herein in their entirety.

FIELD OF THE DISCLOSURE

This disclosure relates generally to audio signal processing, and, more particularly, to methods and apparatus to fingerprint an audio signal.

BACKGROUND

Audio information (e.g., sounds, speech, music, etc.) can be represented as digital data (e.g., electronic, optical, etc.). Captured audio (e.g., via a microphone) can be digitized, stored electronically, processed, and/or cataloged. One way of cataloging audio information is by generating an audio fingerprint. Audio fingerprints are digital summaries of audio information created by sampling a portion of the audio signal. Audio fingerprints have historically been used to identify audio and/or verify audio authenticity.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
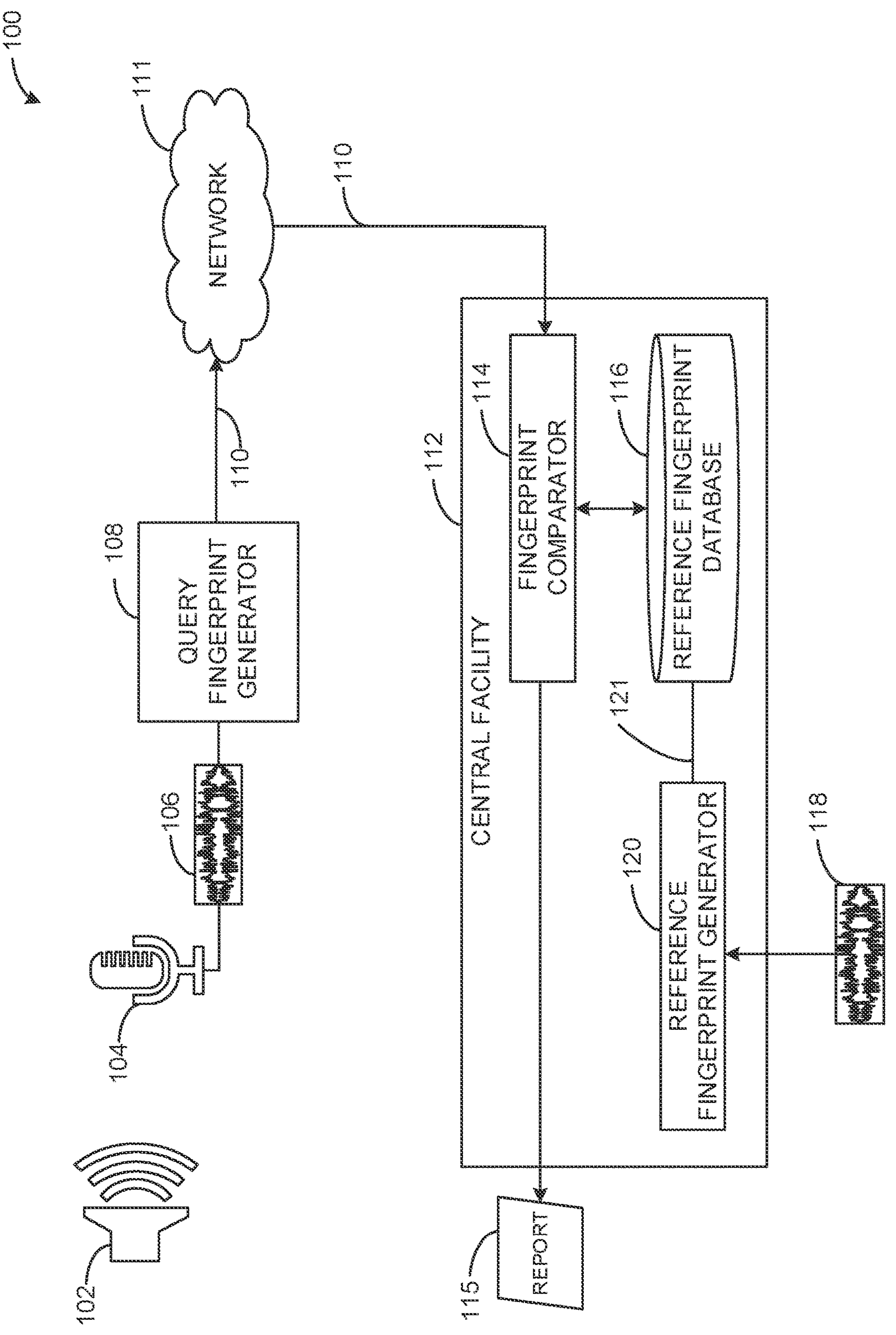
FIG. 1 is an example system in which the teachings of this disclosure may be implemented.

Unless specifically stated otherwise, descriptors such as "first," "second." "third." etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Fingerprint or signature-based media monitoring techniques generally utilize one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature can be a series of sub-signatures collected in series over a time interval. The term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored media signature(s) to one or more reference signatures corresponding to known (e.g., reference) media sources. Various comparison criteria, such as a cross-correlation value, a Hamming distance, etc., can be evaluated to determine whether a monitored signature matches a particular reference signature.

When a match between the monitored signature and one of the reference signatures is found, the monitored media can be identified as corresponding to the particular reference media represented by the reference signature that matched with the monitored media signature. Because attributes, such as an identifier of the media, a presentation time, a broadcast channel, etc., are collected for the reference signature, these attributes can then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Historically, audio fingerprinting technology has used the loudest parts (e.g., the parts with the most energy, etc.) of an audio signal to create fingerprints in a time segment. In some examples, the loudest parts of an audio signal can be associated with noise (e.g., unwanted audio) and not from the audio of interest. In some examples, fingerprints generated using historic audio fingerprint technology would be generated based on the background noise and not of the audio of interest, which reduces the usefulness of the generated fingerprint. Additionally, fingerprints of music generated using these historic audio fingerprint technologies often are not generated information from all parts of the audio spectrum that can be used for signature matching because the bass spectrum of audio tends to be louder than other frequencies spectra in the audio (e.g., treble ranges, etc.). Some example methods, apparatus, systems, and articles of manufacture to overcome the above-noted deficiencies by generating fingerprints using mean normalization and are disclosed in U.S. patent application Ser. No. 16/453,654, which is hereby incorporated by reference in its entirety.

Audio signaturing technologies, like the technologie(s) disclosed in U.S. patent application Ser. No. 16/453,654, use characteristics of temporal adjacent audio spectra characteristics to normalize specific aspects of the audio signal. The normalized audio spectra are then used to generate audio fingerprints. That is, the fingerprint of a specific portion of an audio signal is based upon a temporal window of the audio signal around that specific portion (e.g., a six second audio window, etc.). This non-local dependence can cause adverse effects on query fingerprint generation and reference fingerprint generation due to boundary/edge effects. For example, if the audio signal includes multiple audio sources (e.g., multiple commercials during an audio signal associated with a commercial break, an audio signal including a song transition, an audio signal including a channel change, etc.), the fingerprint of one audio source may generated based partially on the audio characteristics of the adjacent sources.

Method and apparatus disclosed herein overcome the above noted-deficiencies by determining the relative strength of the portions of the subfingerprints of a fingerprint. In some examples disclosed herein, each portion of a subfingerprint can be characterized based on how dependent the value of that portion is on the variations in the surrounding audio signal region. In such examples disclosed herein, weak portions of a subfingerprint correspond to portions of a subfingerprint that frequently change due to noise or surrounding characteristics of the audio signal. In such examples disclosed herein, strong portions of a subfingerprint correspond to portions of a subfingerprint that infrequently change due to noise or surrounding characteristics of the audio signal. In some examples disclosed herein, during reference fingerprint generation, alternative fingerprints can be generated based on the identified weak subfingerprint portions based on the probability of their occurrences. In some examples disclosed herein, during the generation of a query fingerprint, modified query fingerprints can be generated by changing the weak portions of the query fingerprint. In some examples disclosed herein, weak portions of the subfingerprint can be excluded during fingerprint matching.

FIG. 1 is an example system 100 in which the teachings of this disclosure can be implemented. The example system 100 includes an example audio source 102, an example microphone 104 that captures sound from the audio source 102 and converts the captured sound into an example audio signal 106. An example query fingerprint generator 108 receives the audio signal 106 and generates one or more example query fingerprint(s) 110, which is transmitted over an example network 111 to an example central facility 112. The central facility 112 includes an example fingerprint comparator 114, which matches the example query fingerprint(s) 110 to fingerprints of an example reference fingerprint database 116 to generate an example media identification report 115. The example reference fingerprint database 116 includes reference fingerprints generated by a reference fingerprint generator 120. In the illustrated example of FIG. 1, the reference fingerprint generator 120 generates reference fingerprints based on a reference audio signal 118.

The example audio source 102 emits an audible sound. The example audio source can be a speaker (e.g., an electroacoustic transducer, etc.), a live performance, a conversation, and/or any other suitable source of audio. The example audio source 102 can include desired audio (e.g., the audio to be fingerprinted, etc.) and can also include undesired audio (e.g., background noise, etc.). In the illustrated example, the audio source 102 is a speaker. In other examples, the audio source 102 can be any other suitable audio source (e.g., a person, etc.).

The example microphone 104 is a transducer that converts the sound emitted by the audio source 102 into the audio signal 106. In some examples, the microphone 104 can be a component of a computer, a mobile device (a smartphone, a tablet, etc.), a navigation device, or a wearable device (e.g., a smartwatch, etc.). In some examples, the microphone can include an analog-to digital converter to digitize the audio signal 106. In other examples, the query fingerprint generator 108 can digitize the audio signal 106.

The example audio signal 106 is a digitized representation of the sound emitted by the audio source 102. In some examples, the audio signal 106 can be saved on a computer before being processed by the query fingerprint generator 108. In some examples, the audio signal 106 can be transferred over a network (e.g., the network 111, etc.) to the example query fingerprint generator 108. Additionally or alternatively, any other suitable method can be used to generate the audio (e.g., digital synthesis, etc.).

The example query fingerprint generator 108 converts the example audio signal 106 into the example query fingerprint(s) 110. In some examples, the query fingerprint generator 108 can convert some or all of the audio signal 106 into the frequency domain. In some examples, the query fingerprint generator 108 divides the audio signal into time-frequency bins. In some examples, the audio characteristic is the energy of the audio signal. In other examples, any other suitable audio characteristic can be determined and used to normalize each time-frequency bin (e.g., the entropy of the audio signal, etc.). In some examples, the query fingerprint generator 108 identifies the weak portions of the query fingerprint(s) 110 and modifies the query fingerprint(s) 110 to replace the identified weak portions. Additionally or alternatively, any suitable means can be used to generate the query fingerprint(s) 110. In some examples, some or all of the components of the query fingerprint generator 108 can be implemented by a mobile device (e.g., a mobile device associated with the microphone 104, etc.). In other examples, the query fingerprint generator 108 can be implemented by any other suitable device(s). An example implementation of the query fingerprint generator 108 is described below in conjunction with FIG. 2.

The example query fingerprint(s) 110 are a condensed digital summary of the audio signal 106 that can be used to identify and/or verify the audio signal 106. For example, the query fingerprint(s) 110 can be generated by sampling portions of the audio signal 106 and processing those portions. In some examples, the query fingerprint(s) 110 is composed of a plurality of subfingerprints, which correspond to distinct samples of the audio signal 106. In some examples, the query fingerprint(s) 110 is associated with a period of time (e.g., six seconds, 48 seconds, etc.) of audio signal 106. In some examples, the query fingerprint(s) 110 can include samples of the highest energy portions of the audio signal 106. In some examples, the query fingerprint(s) 110 can be used to identify the audio signal 106 (e.g., determine what song is being played, etc.). In some examples, the query fingerprint(s) 110 can be used to verify the authenticity of the audio signal 106.

The example network 111 is a network that allows the query fingerprint(s) 110 to be transmitted to the central facility 112 and fingerprint comparator 114. For example, the network 111 is a local area network (LAN), a wide area network (WAN), etc. In some examples, the network 111 is the Internet. In some examples, the network 111 is a wired connection. In some examples, the network 111 is absent. In such examples, the query fingerprint(s) 110 can be transmitted to the central facility 112 by any other suitable means (e.g., a physical storage device, etc.). Additionally or alternatively, the query fingerprint generator 108, the reference fingerprint generator 120, and/or the fingerprint comparator 114 can be implemented by or at the same device (e.g., a server at the central facility 112 of media monitoring entity, etc.).

The central facility 112 is a facility operated to analyze reference fingerprints, associated with an interested party to analyze, identify, and categorize audio signals (e.g., a media monitoring entity, a media provider, etc.). In some examples, the central facility 112 can be include and/or be implemented by a server. In some examples, the central facility 112 can be implemented by a cloud service, a distributed system at several locations, and/or any other suitable means. In the illustrated example of FIG. 1, the central facility 112 includes the fingerprint comparator 114, the reference fingerprint database 116, and the reference fingerprint generator 120. In other examples, the fingerprint comparator 114, the reference fingerprint database 116, and the reference fingerprint generator 120 can be implemented at any other suitable location (e.g., at a user device, at a third party location, etc.).

The example fingerprint comparator 114 receives and processes the query fingerprint(s) 110. For example, the fingerprint comparator 114 can match the query fingerprint(s) 110 to one or more reference fingerprint(s) stored in the reference fingerprint database 116. In some examples, the fingerprint comparator 114 can determine the query fingerprint(s) 110 matches none of the reference fingerprints stored in the reference fingerprint database 116. In such examples, the fingerprint comparator 114 returns a result indicating the media associated with the reference fingerprint could not be identified. In some examples, one of the query fingerprint(s) 110 can be compared to multiple reference fingerprints associated with one reference audio signal. In such examples, a match with any of the reference fingerprints indicates the query fingerprint(s) 110 is associated with the same media as the reference audio signal 118. Additionally or alternatively, multiple query fingerprint(s) 110 can be compared with the reference fingerprint(s) 121. In some such examples, a match with any of the reference fingerprints indicates the query fingerprint(s) 110 is associated with the same media as the reference audio signal 118.

The reference fingerprint database 116 stores a plurality of reference fingerprint(s) corresponding to one or more pre-identified pieces of media. The reference fingerprint database 116 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The reference fingerprint database 116 can additionally or alternatively be implemented by one or more double data rate (DDR) memories, such as DDR, DDR2, DDR3, DDR4, mobile DDR (mDDR), etc. The reference fingerprint database 116 can additionally or alternatively be implemented by one or more mass storage devices such as hard disk drive(s), compact disk drive(s), digital versatile disk drive(s), solid-state disk drive(s), etc. In the illustrated example of FIG. 1, the reference fingerprint database 116 is illustrated as a single database. In other examples, the reference fingerprint database 116 can be implemented by any number and/or type(s) of databases. Furthermore, the reference fingerprint(s) stored in the reference fingerprint database 116 may be in any data format. (e.g., an 8 bit integer number, a 32 bit floating point number, etc.).

The reference audio signal 118 is a digitized representation of the sound emitted. In some examples, the reference audio signal 118 is audio captured by a microphone in a manner similar to the audio signal 106. In other examples, the reference audio signal can be already digitized audio received (e.g., extracted, etc.) from a storage medium (e.g., a hard disk, a compact disk (CD), a record, a cassette, etc.) and/or another type of media (e.g., the audio of a movie, the audio of television program, the audio of streaming media, etc.). In some examples, the reference audio signal 118 is provided to the central facility 112 by an interested party (e.g., a publisher of the audio, etc.). In such examples, the reference audio signal 118 can be transferred over a network to the reference fingerprint generator 120.

The reference fingerprint generator 120 converts the example reference audio signal 118 into the example reference fingerprint 121. For example, the reference fingerprint generator 120 can convert the reference audio signal 118 into the reference fingerprint(s) 121 in a manner similar to that of the query fingerprint generator 108. In other examples, the reference fingerprint generator 120 can convert the reference audio signature by any other suitable means. An example implementation of the reference fingerprint generator 120 is described below in conjunction with FIG. 3.

The reference fingerprint(s) 121 is/are a condensed digital summary of the reference audio signal 118 that can be used to identifies the reference audio signal 118. The reference fingerprint(s) 121 generally have the same structure as the query fingerprint(s) 110. For example, the reference fingerprint(s) 121 is composed of a plurality of subfingerprints, which correspond to distinct samples of the reference audio signal 118. As such, the query fingerprint(s) 110 can be compared to the reference fingerprint(s) 121. In some examples, the reference fingerprint(s) 121 can be formatted differently than the query fingerprint(s) 110. For example, the reference fingerprint(s) 121 can be generated at a higher fidelity and/or at a different sample rate than the query fingerprint(s) 110.

Figure 2:
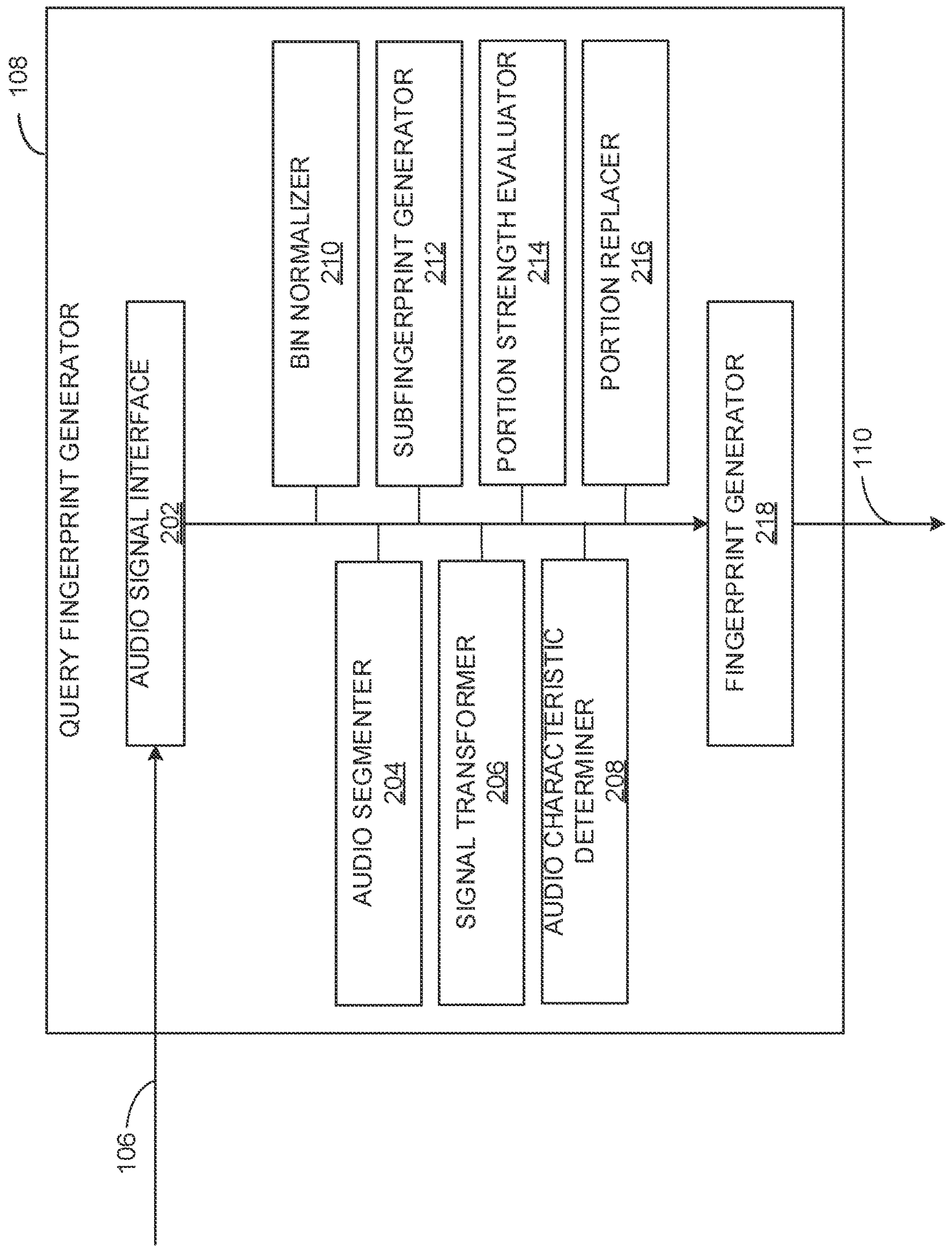
FIG. 2 is an example implementation of the query fingerprint generator of FIG. 1.

FIG. 2 is an example implementation of the example query fingerprint generator 108 of FIG. 1. The example query fingerprint generator 108 includes an example audio signal interface 202, an example audio segmenter 204, an example signal transformer 206, an example audio characteristic determiner 208, an example bin normalizer 210, an example subfingerprint generator 212, an example portion strength evaluator 214, an example portion replacer 216, and an example fingerprint generator 218.

The example audio signal interface 202 receives the digitized audio signal from the microphone 104. In some examples, the audio signal interface 202 can request the digitized audio signal from the microphone 104 periodically. In other examples, the audio signal interface 202 can receive the audio signal 106 from the microphone 104 as soon as the audio is detected. In some examples when the microphone 104 is absent, the audio signal interface 202 can request the digitized audio signal 106 from a database. In some examples, the audio signal interface 202 can include an analog-to-digital converter to convert the audio received by the microphone 104 into the audio signal 106.

The example audio segmenter 204 divides the audio signal 106 into audio segments (e.g., frames, periods, etc.). For example, the audio segmenter can divide the audio signal 106 into discrete audio segments corresponding to unique portions of the audio signal 106. In some examples, the audio segmenter 204 determines which portions of the audio signal 106 correspond to each of the generated audio segments. In some examples, the audio segmenter 204 can generate segments of any suitable size.

The example signal transformer 206 transforms portions of the audio signal of the digitized audio signal 106 into the frequency domain. For example, the signal transformer 206 performs a fast Fourier transform (FFT) on an audio signal 106 to transform the audio signal 106 into the frequency domain. In other examples, the signal transformer 206 can use any suitable technique to transform the audio signal 106 (e.g., discrete Fourier transforms, a sliding time window Fourier transform, a wavelet transform, a discrete Hadamard transform, a discrete Walsh Hadamard, a discrete cosine transform, etc.). In some examples, each time-frequency bin has an associated magnitude (e.g., the magnitude of the transformed signal in that time-frequency bin, etc.). In some examples, the signal transformer 206 can be implemented by one or more band-pass filters (BPFs). In some examples, the output of the example signal transformer 206 can be represented by a spectrogram. In some examples, the signal transformer 206 works concurrently with the audio segmenter 204. An example output of the signal transformer 206 is discussed below in conjunction with FIG. 4A.

The example audio characteristic determiner 208 determines the audio characteristic(s) of a portion of the audio signal 106 (e.g., an audio region associated with a time-frequency bin, etc.). The audio characteristic determiner 208 can determine the audio characteristics of a group of time-frequency bins (e.g., the energy of the portion of the audio signal 106 corresponding to each time-frequency bin in a group of time-frequency bins, the entropy of the portion of the audio signal 106 corresponding to each time-frequency bin in a group of time-frequency bins, etc.). For example, the audio characteristic determiner 208 can determine the mean energy (e.g., average power, etc.) of one or more of the audio regions associated with an audio region (e.g., the mean of the magnitudes squared of the transformed signal corresponding to the time-frequency bins in the region, etc.) adjacent to a selected time-frequency bin. In other examples, the audio characteristic determiner 208 can determine the mean entropy of one or more of the audio regions associated with an audio region (e.g., the mean of the magnitudes of the time-frequency bins in the region, etc.) adjacent to a selected time-frequency bin. In other examples, the audio characteristic determiner 208 can determine the mean energy and/or mean entropy by any other suitable means. Additionally or alternatively, the audio characteristic determiner 208 can determine other characteristics of a portion of the audio signal (e.g., the mode energy, the median energy, the mode power, the median energy, the mean energy, the mean amplitude, etc.).

The example bin normalizer 210 normalizes one or more time-frequency bins by an associated audio characteristic of the surrounding audio region. For example, the bin normalizer 210 can normalize a time-frequency bin by a mean energy of the surrounding audio region. In other examples, the bin normalizer 210 normalizes some of the audio signal frequency bins by an associated audio characteristic of the surrounding audio region. For example, the bin normalizer 210 can normalize each time-frequency bin using the mean energy associated with the audio region surrounding that time-frequency bin. In some examples, the output of the bin normalizer 210 (e.g., a normalized time-frequency bin, etc.) can be represented as a spectrogram.

The example subfingerprint generator 212 generates subfingerprints associated with an audio sample(s) and/or audio segment at a sample rate. In some examples, the subfingerprint generator 212 generates a subfingerprint of a sample after the bin normalizer 210 has normalized the energy value of each time-frequency bin in an audio segment. In some examples, the subfingerprint generator 212 generates the subfingerprint associated with a sample based on the energy extrema of the normalized time-frequency bins within the sample. In some examples, the subfingerprint generator 212 selects a group of time-frequency bins (e.g., one bin, five bins, 20 bins, etc.) with the highest normalized energy values in a sample to generate a subfingerprint. In such examples, each portion of the subfingerprints generated by subfingerprint generator 212 is associated with a location of a particular energy extremum in the normalized spectrogram generated by the bin normalizer 210.

The example portion strength evaluator 214 evaluates the strength of each portion of the subfingerprints generated by the subfingerprint generator 212. For example, the portion strength evaluator 214 can repeat the subfingerprint generation process (e.g., the process executed by the example signal transformer 206, the example audio characteristic determiner 208, the example bin normalizer 210, the example subfingerprint generator 212, etc.) but overlaying the audio signal with randomly generated noise (e.g., white noise, artificially generated background audio, etc.). In some examples, because the subfingerprints associated with each audio sample depend on audio characteristics of adjacent samples, the portion strength evaluator 214 can determine the strength of the portions of a subfingerprint by changing the audio characteristics of adjacent audio samples. For example, for subfingerprints associated with temporal ends of the audio signal 106 (e.g., the beginning of the audio signal, the end of the audio signal), the portion strength evaluator 214 can append different audio (e.g., white noise, artificially generated background audio, other media, etc.). Additionally or alternatively, the portion strength evaluator 214 can, for some or all samples of the audio signal, replace the adjacent audio samples with different audio (e.g., white noise, artificially generated background audio, different media, etc.).

Based on how the portions of subfingerprints change, the portion strength evaluator 214 can label portions of a subfingerprint as "weak." "strong." or "neutral." As used herein, a weak portion of a subfingerprint frequently changes based on audio overlays or adjacent feature testing. As used herein, a strong portion of a subfingerprint does not frequently change based on audio overlays or adjacent feature testing. As used herein, a neutral portion of a subfingerprint is portion of the subfingerprint that is neither strong nor weak portions. In some examples, the portion strength evaluator 214 determines the strength of a portion of subfingerprint based on one or more strength threshold. In such examples, the portion strength evaluator 214 can conduct a plurality of trials (e.g., multiple noise overlays, multiple sample replacements, etc.) and count the number of times a given portion of subfingerprint changes. In some examples, if a portion changes more than a weak strength threshold is identified as a weak portion. In some examples, if a portion changes less than a strong strength threshold, the portion is identified as a strong portion. In some examples, if a portion satisfies neither the weak nor strong thresholds, the portion is identified as a neutral.

The example portion replacer 216 replaces portions of the generated subfingerprint generator 212 identified as weak by the portion strength evaluator 214. For example, the portion replacer 216 can replace weak portions of generated subfingerprints with random audio. In such examples, the portion replacer 216 can replace some or all of the identified weak portions with a random portion. For example, the portion replacer 216 can replace the weak portions with audio generated during the operation of the portion strength evaluator 214. In other examples, the portion replacer 216 can replace the identified weak portions with any other suitable portion.

The example fingerprint generator 218 generates a fingerprint based on the subfingerprints generated by the subfingerprint generator 212 and/or the portion replacer 216. For example, the fingerprint generator 218 can generate the query fingerprint(s) 110 based on the subfingerprints (e.g., query subfingerprints, etc.) generated by the subfingerprint generator 212. For example, the fingerprint generator 218 can concatenate the subfingerprints associated with each audio segment into the query fingerprint(s) 110. In some examples, the fingerprint generator 218 can generate a fingerprint including the subfingerprints in which the weak portions have been replaced by the portion replacer 216. In some examples, the fingerprint generator 218 can generate multiple query fingerprints based on the portions of the subfingerprints. In such examples, the fingerprint generator 218 can generate fingerprints including different subfingerprints of which the weak portions have been replaced. In some examples, the portion replacer 216 can be omitted. In such examples, the fingerprint generator 218 can generate multiple fingerprints based on different audio overlays and/or audio sample appendages.

While an example manner of implementing the query fingerprint generator 108 of FIG. 1 is illustrated in FIG. 2, one or more of the elements, processes and/or devices illustrated in FIG. 2 may be combined, divided, re-arranged, omitted, eliminated and/or implemented in any other way. Further, the example audio signal interface 202, the example audio segmenter 204, the example signal transformer 206, the example audio characteristic determiner 208, the example bin normalizer 210, the example subfingerprint generator 212, the example portion strength evaluator 214, the example portion replacer 216, an example fingerprint generator 218, and/or, more generally, the example query fingerprint generator 108 of FIG. 2 may be implemented by hardware, software, firmware and/or any combination of hardware, software and/or firmware. Thus, for example, any of the example audio signal interface 202, the example audio segmenter 204, the example signal transformer 206, the example audio characteristic determiner 208, the example bin normalizer 210, the example subfingerprint generator 212, the example portion strength evaluator 214, the example portion replacer 216, an example fingerprint generator 218, and/or, more generally, the example query fingerprint generator 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio signal interface 202, the example audio segmenter 204, the example signal transformer 206, the example audio characteristic determiner 208, the example bin normalizer 210, the example subfingerprint generator 212, the example portion strength evaluator 214, the example portion replacer 216, an example fingerprint generator 218, is/are hereby expressly defined to include a non-transitory computer readable storage device or storage disk such as a memory, a digital versatile disk (DVD), a compact disk (CD), a Blu-ray disk, etc. including the software and/or firmware. Further still, the example query fingerprint generator 108 of FIG. 2 may include one or more elements, processes and/or devices in addition to, or instead of, those illustrated in FIG. 2, and/or may include more than one of any or all of the illustrated elements, processes, and devices. As used herein, the phrase "in communication." including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
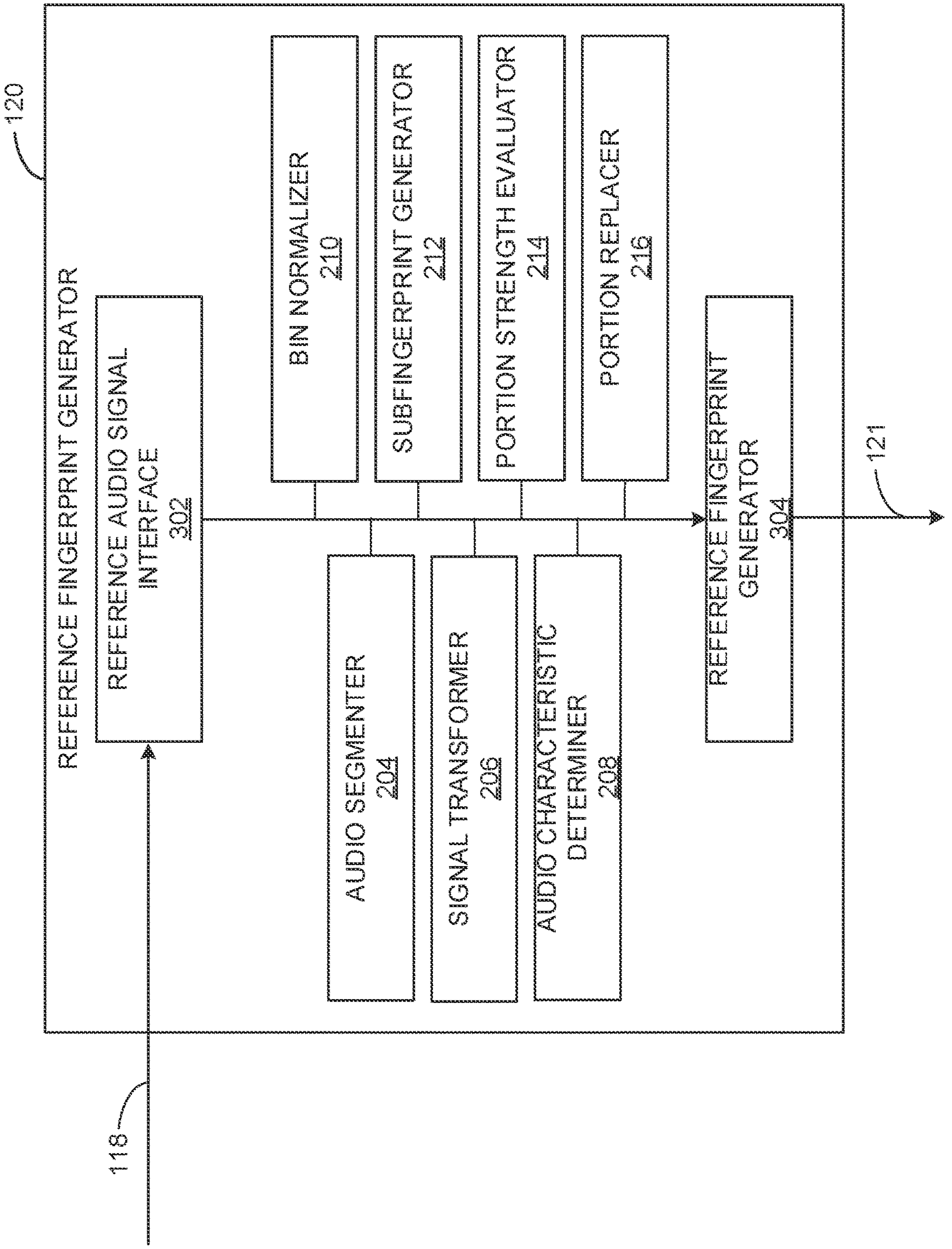
FIG. 3 is an example implementation of the reference fingerprint generator of FIG. 1.

FIG. 3 is an example implementation of the reference fingerprint generator 120 of FIG. 1. In the illustrated example of FIG. 3, the reference fingerprint generator 120 includes an example reference audio signal interface 302 and an example reference fingerprint generator 304. In the illustrated example of FIG. 3, the reference fingerprint generator 120 includes the example audio segmenter 204 of FIG. 2, the example signal transformer 206 of FIG. 2, the example audio characteristic determiner 208 of FIG. 2, the example bin normalizer 210 of FIG. 2, the example subfingerprint generator 212 of FIG. 2, the example portion strength evaluator 214, and the portion replacer 216 of FIG. 2. Unless stated otherwise, the audio segmenter 204 of FIG. 3, the signal transformer 206 of FIG. 3, the example audio characteristic determiner 208 of FIG. 3, the example bin normalizer 210 of FIG. 3, the example subfingerprint generator 212 of FIG. 3, the example portion strength evaluator 214, and the portion replacer 216 of FIG. 3 function substantially as the counterparts described in conjunction with FIG. 2 unless stated otherwise.

The example reference audio signal interface 302 receives the reference audio signal 118. In some examples, the reference audio signal interface 302 receives a digitized reference audio signal 118 (e.g., actual audio captured by a microphone, transferred over a network, etc.). In some examples, the reference audio signal interface 302 can be implemented by audio processing hardware (e.g., a CD-player, a record player, etc.) In some examples when the microphone 104 is absent, the audio signal interface 202 can request the reference audio signal 118 from a database. In some examples, the audio signal interface 202 can include an analog-to-digital converter to convert the audio into the reference audio signal 118.

The example reference fingerprint generator 304 generates a fingerprint based on the subfingerprints. For example, the reference fingerprint generator 304 can generate the reference fingerprint(s) 121 based on the subfingerprints (e.g., reference subfingerprints, etc.) generated by the subfingerprint generator 212. For example, the fingerprint generator 218 can concatenate the subfingerprints associated with each audio segment into the query fingerprint(s) 110. In some examples, the fingerprint generator 218 can generate multiple reference fingerprints based on the portions of the subfingerprints. For example, the reference fingerprint generator 304 can generate two or more reference fingerprint(s) 121. In such examples, the reference fingerprint generator 304 can store multiple reference fingerprints in the reference fingerprint database 116. During matching, a generated query fingerprint (e.g., the query fingerprint(s) 110 of FIG. 1) can be compared to each of the related reference fingerprint(s) 121.

While an example manner of implementing the reference fingerprint generator 120 of FIG. 1 is illustrated in FIG. 3, one or more of the elements, processes and/or devices illustrated in FIG. 3 may be combined, divided, re-arranged, omitted, eliminated and/or implemented in any other way. Further, the example reference audio signal interface 302, the example audio segmenter 204, the example signal transformer 206, the example audio characteristic determiner 208, the example bin normalizer 210, the example subfingerprint generator 212, the example portion strength evaluator 214, the example portion replacer 216, the example reference fingerprint generator 304, and/or, more generally, the example reference fingerprint generator 120 of FIG. 3 may be implemented by hardware, software, firmware and/or any combination of hardware, software and/or firmware. Thus, for example, any of the example reference audio signal interface 302, the example audio segmenter 204, the example signal transformer 206, the example audio characteristic determiner 208, the example bin normalizer 210, the example subfingerprint generator 212, the example portion strength evaluator 214, the example portion replacer 216, the example reference fingerprint generator 304 and/or, more generally, the example reference fingerprint generator 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reference audio signal interface 302, the example audio segmenter 204, the example signal transformer 206, the example audio characteristic determiner 208, the example bin normalizer 210, the example subfingerprint generator 212, the example portion strength evaluator 214, the example portion replacer 216, the example reference fingerprint generator 304, is/are hereby expressly defined to include a non-transitory computer readable storage device or storage disk such as a memory, a digital versatile disk (DVD), a compact disk (CD), a Blu-ray disk, etc. including the software and/or firmware. Further still, the example reference fingerprint generator 120 of FIG. 3 may include one or more elements, processes and/or devices in addition to, or instead of, those illustrated in FIG. 4, and/or may include more than one of any or all of the illustrated elements, processes, and devices. As used herein, the phrase "in communication." including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4A:
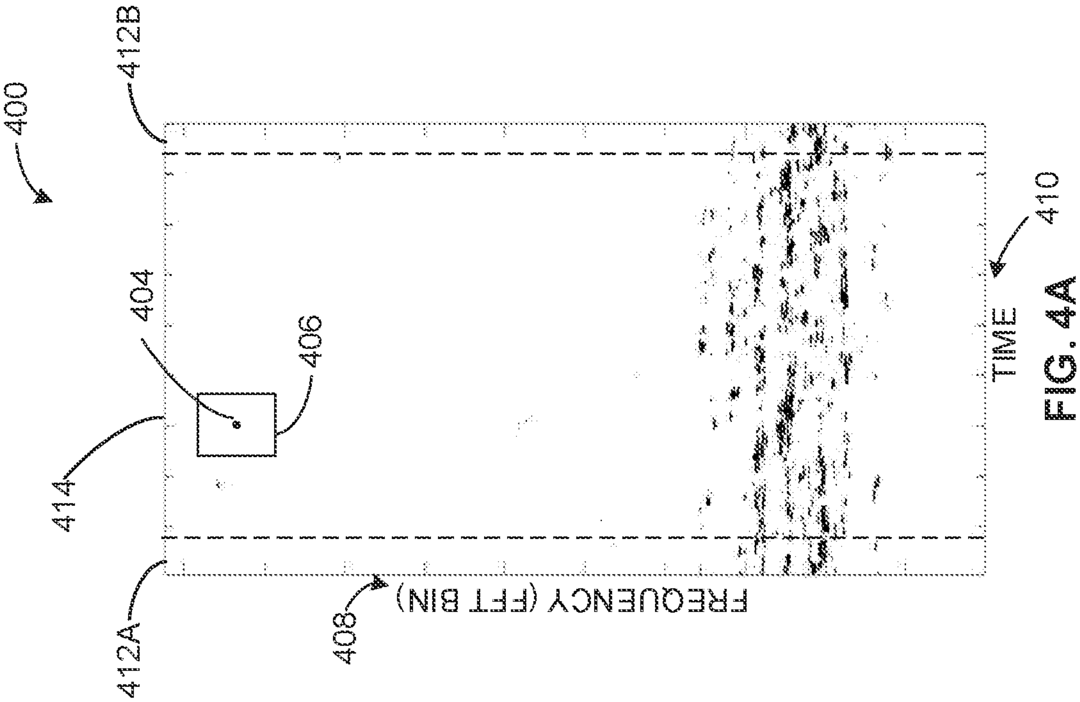
FIG. 4A depicts an example unprocessed spectrogram generated by the example signal transformer of FIG. 2.

FIG. 4A depicts an example unprocessed spectrogram 400 generated by the example signal transformer 206 of FIG. 2. In the illustrated example of FIG. 4A, the example unprocessed spectrogram 400 includes an example first time-frequency bin 404 surrounded by an example first audio region 406. The example unprocessed spectrogram 400 of FIG. 4A includes an example vertical axis 408 denoting frequency bins and an example horizontal axis 410 denoting time bins. In the illustrated example of FIG. 4A, the spectrogram 400 is divided into example first edge region 412A, an example second edge region 412B, and a center region 414. The example unprocessed spectrogram 400 further includes an example second time-frequency bin 418 surrounded by an example second audio region 420.

The example first audio region 406 from which the normalization audio characteristic is derived by the audio characteristic determiner 208 and used by the bin normalizer 210 to normalize the first time-frequency bins 404. In the illustrated example, each time-frequency bin of the unprocessed spectrogram 400 is normalized to generate a normalized spectrogram. In other examples, any suitable number of the time-frequency bins of the unprocessed spectrogram 400 can be normalized to generate a normalized spectrogram. An example normalized spectrogram generated by the bin normalizer 210 of FIGS. 2 and 3 is depicted in FIG. 4C.

The example vertical axis 408 has frequency bin units generated by a fast Fourier Transform (FFT) and has a length of 1024 FFT bins. In other examples, the example vertical axis 308 can be measured by any other suitable techniques of measuring frequency (e.g., Hertz, another transformation algorithm, etc.). In some examples, the vertical axis 408 encompasses the entire frequency range of the audio signal 106 and/or reference audio signal 118. In other examples, the vertical axis 408 can encompass a portion of the audio signal 106 and/or the reference audio signal 118.

In the illustrated examples, the example horizontal axis 410 represents a time period of the unprocessed spectrogram 400 that has a total length of 11.5 seconds. In the illustrated example, horizontal axis 410 has sixty-four milliseconds (ms) intervals as units. In other examples, the horizontal axis 410 can be measured in any other suitable units (e.g., 1 second, etc.). For example, the horizontal axis 410 encompasses the complete duration of the audio. In other examples, the horizontal axis 410 can encompass a portion of the duration of the audio signal 106. In the illustrated example, each time-frequency bin of the spectrograms 300, 302 has a size of 64 ms by 1 FFT bin.

In the illustrated example of FIG. 4A, the first time-frequency bin 404 is associated with an intersection of a frequency bin and a time bin of the unprocessed spectrogram 400 and a portion of the audio signal 106 or reference audio signal 118 associated with the intersection. The example first audio region 406 includes the time-frequency bins within a pre-defined distance away from the example first time-frequency bin 404. For example, the audio characteristic determiner 208 can determine the vertical length of the first audio region 406 (e.g., the length of the audio region 306A along the vertical axis 408, etc.) based on a set number of FFT bins (e.g., 5 bins, 11 bins, etc.). Similarly, the audio characteristic determiner 208 can determine the horizontal length of the first audio region 406 (e.g., the length of the first audio region 406 along the horizontal axis 410, etc.). In the illustrated example, the first audio region 406 is a square. Alternatively, the first audio region 406 can be any suitable size and shape and can contain any suitable combination of time-frequency bins (e.g., any suitable group of time-frequency bins, etc.) within the unprocessed spectrogram 400. The example audio characteristic determiner 208 can then determine an audio characteristic of time-frequency bins contained within the first audio region 406 (e.g., mean energy, etc.). Using the determined audio characteristic, the bin normalizer 210 of FIGS. 2 and/or 3 can normalize an associated value of the first time-frequency bin 404 (e.g., the energy of first time-frequency bin 404 can be normalized by the mean energy of each time-frequency bin within the first audio region 406).

Figure 4B:
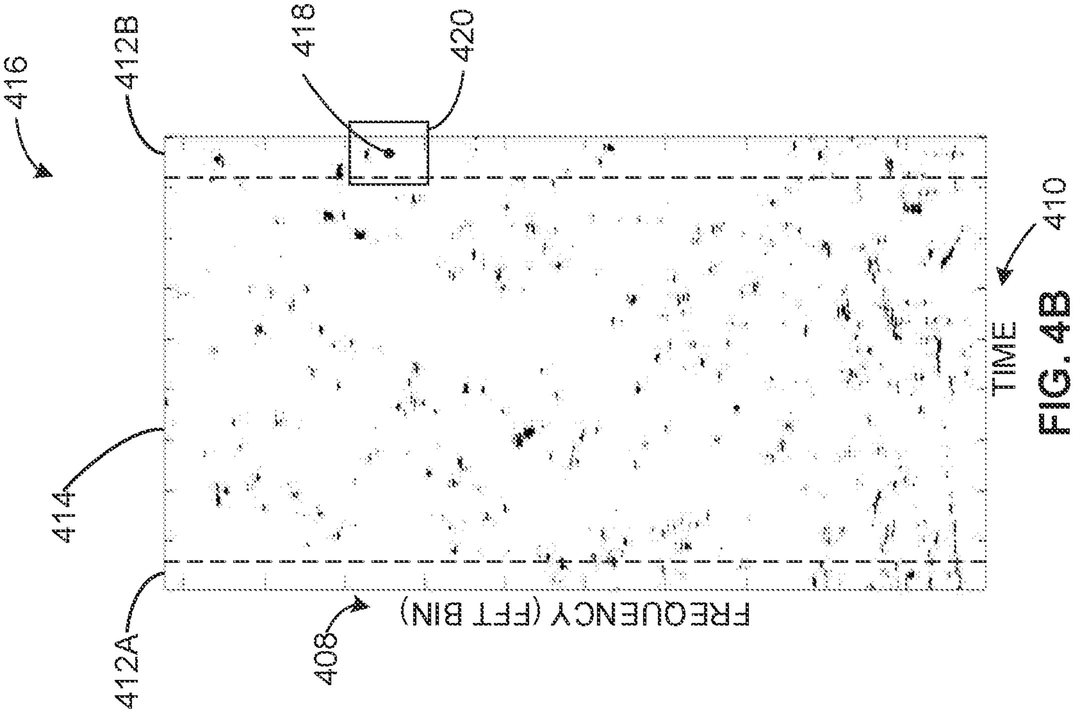
FIG. 4B depicts an example of a normalized spectrogram generated by the signal normalizer of FIG. 2 from the unprocessed spectrogram of FIG. 4A.

FIG. 4B depicts an example of a normalized spectrogram 416 generated by the bin normalizer 210 of FIGS. 2 and/or 3 from the unprocessed spectrogram 400 of FIG. 4A by normalizing a plurality of the time-frequency bins of the unprocessed spectrogram 400 of FIG. 4A. The normalized spectrogram 416 includes the vertical axis 408 of FIG. 4A denoting frequency bins and the horizontal axis 410 of FIG. 4A denoting time bins. The spectrogram 416 is divided into the edge regions 412A, 412B, and the center region 414.

For example, some or all of the time-frequency bins of the unprocessed spectrogram 400 can be normalized in a manner similar to how the first time-frequency bin 404A was normalized. The normalization of the audio signal 106 and subsequent generation of the query fingerprint(s) 110 is described below in conjunction with FIG. 7. The normalization and subsequent generation of the reference fingerprint(s) 121 of the reference audio signal 118 is described below in conjunction with FIG. 8. The resulting frequency bins depicted FIG. 4B have now been normalized by the local mean energy within the local area around the region. As a result, the darker regions are areas that have the most energy in their respective local area. This allows the fingerprint to incorporate relevant audio features even in areas that are low in energy relative to the usual louder bass frequency area.

The spectrograms 400, 416 of FIGS. 4A-4B are divided into the example edge regions 412A, 412B, and the example center region 414. The example edge regions 412A, 412B are the portions of the spectrograms 400, 416 that the audio regions (e.g., the second audio region 420 of FIG. 4A, etc.) associated with the time-frequency bins (e.g., the second time-frequency bin 418 of FIG. 4A, etc.) extends outside the edges of the spectrograms 400, 416. If the audio signal 106 is a discrete signal (e.g., the temporal entirety of the audio signal 106 is represented in the spectrogram 400, etc.), the audio characteristic determiner 208 and bin normalizer 210 can ignore the portion of the audio region 420 without defined characteristics (e.g., there is no portion of the spectrogram associated with that portion of the region, etc.). In other examples, if the audio signal 106 is discrete, the audio characteristic determiner 208 and bin normalizer 210 can account for the undefined region by any other suitable method. If the audio signal 106 is not a discrete signal (e.g., is part of a continuous stream of audio, etc.), the audio characteristic determiner 208 may be capturing audio signal characteristics not associated with the audio signal 106. For example, if the audio signal 106 is a portion of an audio stream associated with a commercial, when the bin normalizer 210 normalizes the time-frequency bins in the first edge region 412A (e.g., the audio from the beginning of the commercial, etc.), each of those time-frequency bins is normalized by a value partially based on the audio characteristics of the audio immediately proceeding media (e.g., the television program, the radio program, a different commercial, etc.). Accordingly, the values of the time-frequency bins in the edge regions 412A, 412B of the normalized spectrogram 416 can vary based on the adjacent audio despite the audio signal 106 being the same. This variance in the normalized spectrogram 416 results in variance in audio fingerprints generated therefrom, which decreases the likelihood of a positive match with reference fingerprints identifying the media associated with the audio signal 106.

Figure 5A:
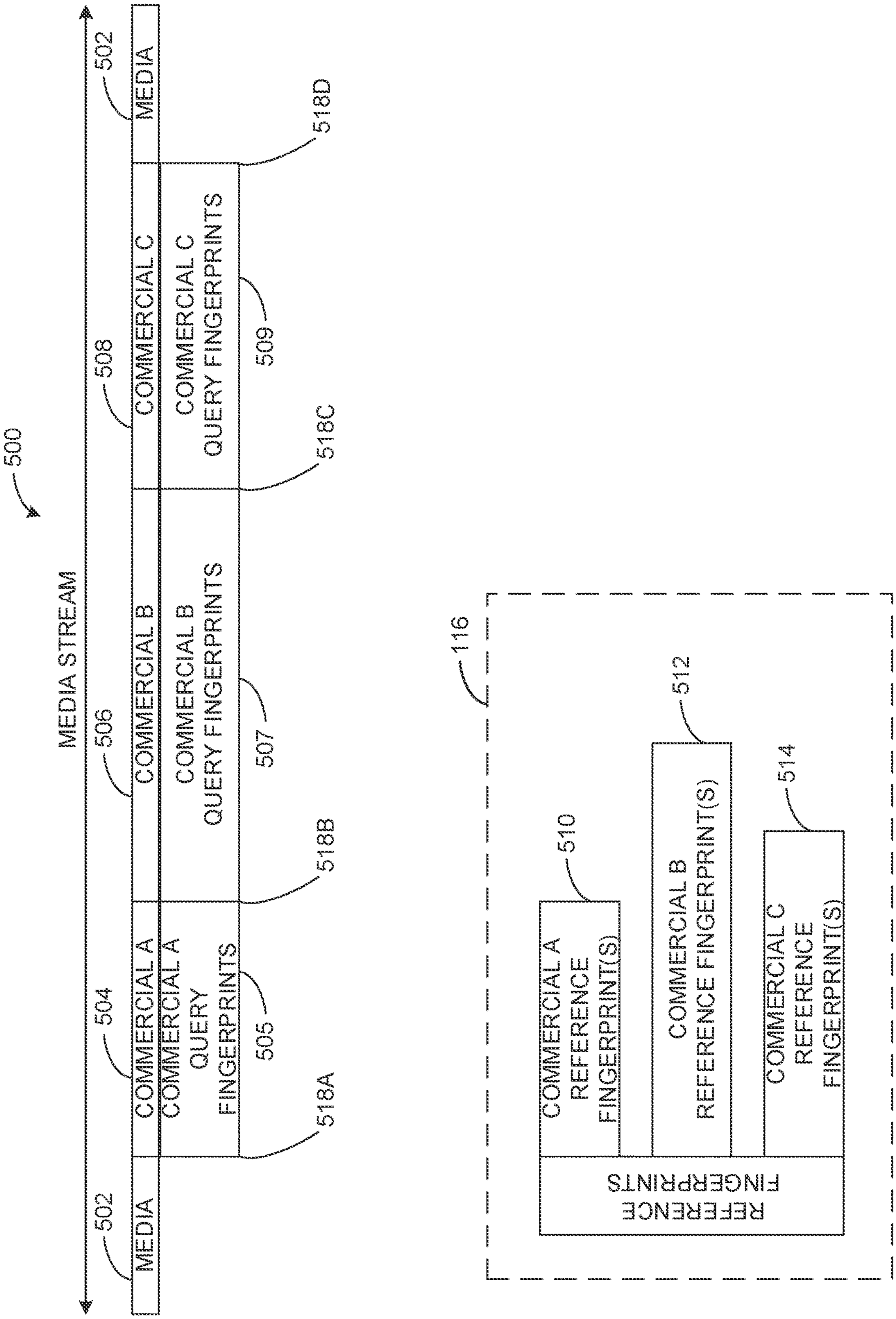
FIG. 5A is the content of an audio signal including commercials that can be processed by the system of FIG. 1.

FIG. 5A is the content of an example media stream 500 including example media 502, an example first commercial 504, an example second commercial 506, and example third commercial 508 that can be processed by the system 100 of FIG. 1. The example commercials 504, 506, 508 have been processed by the query fingerprint generator 108 of FIGS. 1 and/or 2 to generate corresponding an example first query fingerprint 505, an example second query fingerprint 507, and an example third query fingerprint 509, respectively. The example commercials also have an example reference fingerprint 510, an example second reference fingerprint 512, and an example third reference fingerprint 514, respectively, stored in the reference fingerprint database 116. The example media stream includes an example first content change point 518A between the media 502 (e.g., media airing in a television broadcast, etc.) and the first commercial 504, an example second content change point 518B between the first commercial 504 and the second commercial 506, a third content change point 518C, and an example fourth content change point 518D.

The media stream 500 is a stream of audio and/or video content that includes audio. The media stream 500 can be associated with a radio broadcast, a television broadcast, streaming media, and/or any other type of media presentation. The media stream 500) includes different media content arranged continuously. In the illustrated example of FIG. 5A, the media stream 500 includes the example media 502 and the example commercials 504, 506, 508. In other examples, the media stream 500 can include different commercials and/or repeated instances of the same commercial (e.g., multiple instances of the first commercial 504, etc.). The media 502 can include any suitable content associated with the media stream (e.g., music, television programming, etc.).

The commercials 504, 506, 508 are relatively short pieces of media used to advertise various products, services, and/or other things of potential issues to consumers of the media 502. The commercials 504, 506, 508 are of different lengths are relatively short (e.g., less than a minute long, etc.). In the illustrated example of FIG. 5A, the query fingerprints 505, 507, 509 were generated using the query fingerprint generator 108 by analyzing the audio associated with the media stream 500. In other examples, the query fingerprints 505, 507, 509 can be generated by any other suitable means.

The example reference fingerprints 510, 512, 514 are reference fingerprints stored in the reference fingerprint database 116. In the illustrated example of FIG. 5A, the reference fingerprints 510, 512, 514 were generated from the commercials 504, 506, 508, respectively, (e.g., provides by the advertisers, retrieved from a database, etc.) and not from media stream 500. The reference fingerprints 510, 512, 514 were generated using the reference fingerprint generator 120. In other examples, the reference fingerprints 510, 512, 514 can be generated by any other suitable means.

The content change points 518A, 518B, 518C, 518D represent the portions of the media stream where the media content changes. That is, the first content change point 518A represents the transition point between the media 502 and the beginning of the first commercial 504, the second content change point 518B represents the transition point between the end of the first commercial 504 and the beginning of the second commercial 506, the third content change point 518C represents the transition point between the end of the second commercial 506 and the beginning of the third commercial 508, and the fourth content change point 518D represents the transition point between the end of the third commercial 508 and the media 502. Because each subfingerprint of the query fingerprints 505, 507, 509 is generated by normalizing local audio characteristics (e.g., energy extrema, etc.), the subfingerprints of the query fingerprints 505, 507, 509 associated with the portions of the commercials 504, 506, 508, respectively, near the content change points 518A, 518B, 518C, 518D are normalized partly by audio characteristics of adjacent media. For example, the subfingerprints of the first query fingerprint 505 near the first content change point 518A are calculated partly based on the audio characteristics of the media 502, the subfingerprints of the second query fingerprint 507 near the first content change point 518A are partly calculated based the audio characteristics of the first commercial 504, etc. Accordingly, the subfingerprints of the query fingerprints 505, 507, 509 associated with the portions of the commercials 504, 506, 508 near the content change points 518A, 518B, 518C, 518D may not match the corresponding subfingerprints of the reference fingerprints 510, 512, 514 despite being generated from the commercials 504, 506, 508.

The arrangement of commercials (e.g., the commercials 504, 506, 508, etc.) displayed during broadcasts is variable. That is, the media preceding and proceeding the first commercial 504, the second commercial 506, and/or the third commercial 508 can vary depending on the time of broadcast and the broadcasting channel and can be decided by the content provider. As such, the subfingerprints of the generated query fingerprints from the commercials 504, 506, 508 can change depending on the media immediately proceeding and preceding each of the commercials 504, 506, 508. As such, the likelihood of successfully matching the query fingerprints 505, 507, 509 to the reference fingerprints 510, 512, 514 can be inhibited.

Figure 5B:
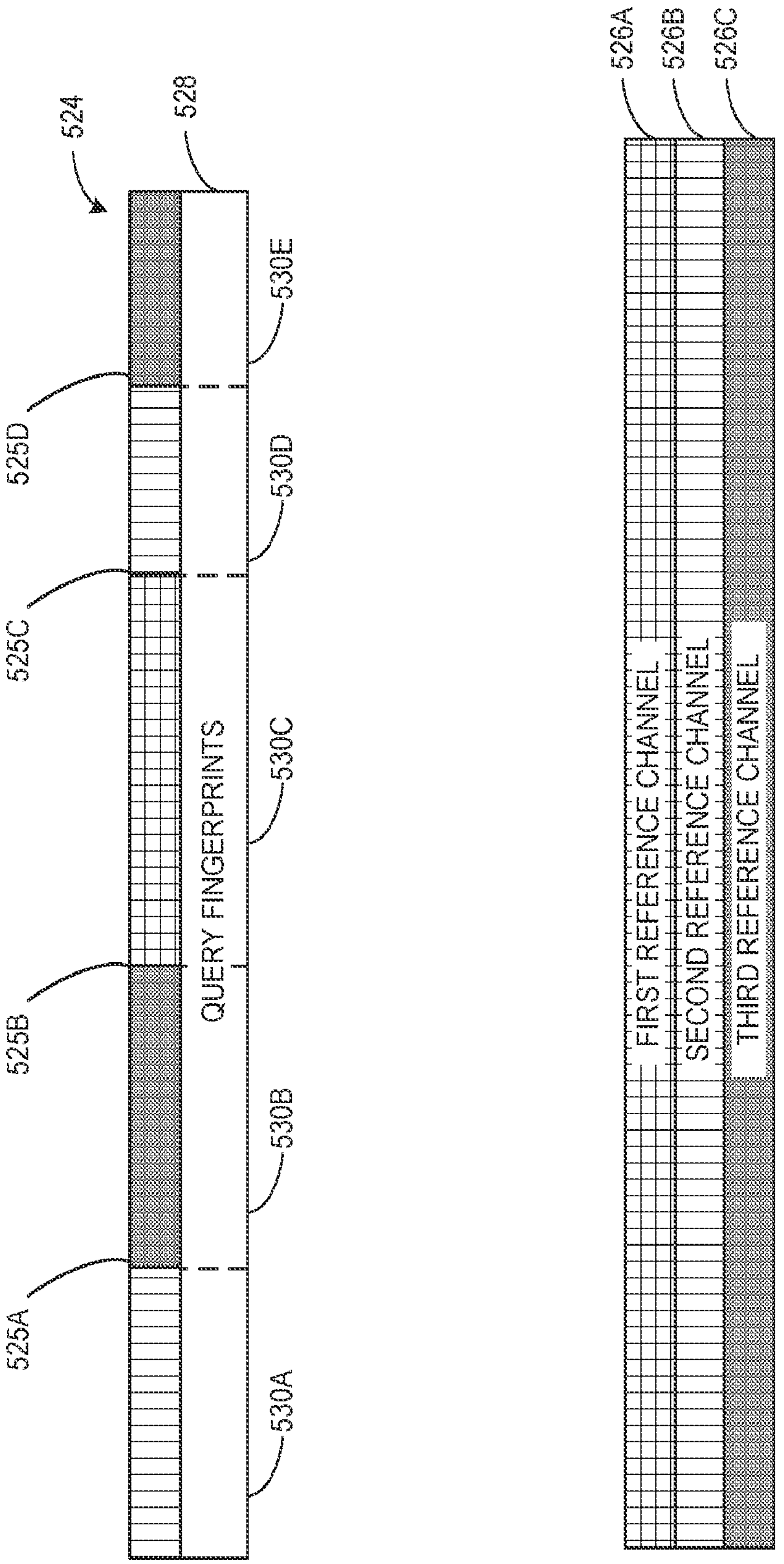
FIG. 5B is the content of an audio signal including multiple channel changes that can be processed by the system of FIG. 1.

FIG. 5B is the content of an example audio signal 524 including example tuning events 525A, 525B, 525C, 525D that can be processed by the system 100 of FIG. 1. In the illustrated example of FIG. 5B, the audio signal 524 includes media associated with an example first channel 526A, an example second channel 526B, and an example third channel 526C. The audio signal 524 is processed to generated example query fingerprints 528 (e.g., by the system 100 of FIG. 1, etc.) composed of an example first query fingerprint portion 530A, an example second query fingerprint portion 530B, an example third query fingerprint portion 530C, and example fourth query fingerprint portion 530D, which are delineated by the tuning events 525A, 525B, 525C, 525D.

The audio signal 524 is composed of media from multiple channels 526A, 526B, 526C. For example, the audio signal 524 can be generated by a user changing (e.g., tuning, etc.) a media device (e.g., a television, a radio, a portable audio device, etc.) between multiple channels. In some examples, the multiple channels 526A, 526B, 526C represent different media broadcasts (e.g., a broadcast from a new channel, a broadcast from a specific sports channel, a specific radio station, etc.). In other examples, the multiple channels 526A, 526B, 526C are different specific pieces of media (e.g., a first movie, a second movie, a third movie, etc.). In some examples, the reference fingerprints corresponding to the media of the channels 526A, 526B, 526C are generated by directly processing the unbroken stream (e.g., without tuning events, etc.) of the multiple channels 526A, 526B, 526C. Each time the user switches between the channels 526A, 526B, 526C, one of the tuning events 525A, 525B, 525C, 525D occurs. For example, at the example first tuning event 525A, the media associated with the audio signal 524 switches from the second channel 526B to the third channel 526C. While the illustrated example of FIG. 5B is only described with reference to three channels and four tuning events, other examples can include any suitable number of channels and tuning events.

The example query fingerprint portions 530A. 530B. 530C. 530D. 530E of the query fingerprints 528 corresponds to the portions of the audio signal 524 delineated by the tuning events 525A. 525B. 525C. 525D. The first query fingerprint portion 530A corresponds to the portion of the audio signal 524 before the first tuning event 525A. The second query fingerprint portion 530B corresponds to the portion of the audio signal between the first tuning event 525A and the second tuning event 525B. The third query fingerprint portion 530C corresponds to the portion of the audio signal 524 between the second tuning event 525B and the third turning event 525C. The fourth query fingerprint portion 530D corresponds to the portion of the audio signal 524 between the third tuning event 525C and the fourth tuning event 525D. The subfingerprints of the first query fingerprint portion 530A and fourth query fingerprint portion 530D can be used to identify the media associated with the second channel 526B. The subfingerprints of the second query fingerprint portion 530B and the fifth query finger portion 530BE can be used to identify the media associated with the third channel 526C. The subfingerprints of the third query fingerprint portion 530C can be used to identify the media associated with the first channel 526A.

Because each subfingerprint of the query fingerprints 528 is generated by normalizing local audio characteristics (e.g., energy extrema, etc.), the subfingerprints of the query fingerprints 528 near the tuning events 525A. 525B. 525C. 525D (e.g., near the beginning or end of each of the query fingerprint portions 530A. 530B. 530C. 530D. 530E, etc.) are normalized partly by audio characteristics of media on channels not corresponding to the actual channel associated with the query fingerprint portions 530A. 530B. 530C. 530D. 530E. For example, the subfingerprints of the query fingerprint portions 530A near the first turning event 525B are normalized partly by the audio characteristics of media associated with the third channel 526C, despite the first query fingerprint portions 530A identifying the media on the second channel 526B. Accordingly, the subfingerprints of the query fingerprints 528 associated with the portions of the audio signal 524 near the tuning events 525A. 525B. 525C. 525D may not match the corresponding subfingerprints of the reference fingerprints identifying the media of the audio channels 526A. 526B. 526C despite being generated from the same reference media.

The location of tuning events (e.g., the tuning events 525A, 525B, 525C, 525D, etc.) in an audio signal are generated by the media consumption of a user. As such, the audio signal 524 is user-determined and not directly identifiable by a monitoring entity. That is, the location of tuning events 525A. 525B. 525C. 525D can be difficult to identify based on the generated query fingerprints (e.g., the query fingerprints 528, etc.). The subfingerprints of the generated query fingerprints 528 from the audio signal 524 can change based on the location of the tuning events. As such, the likelihood of successfully matching the query fingerprints 528 to the corresponding reference fingerprints can be inhibited.

Figure 6:
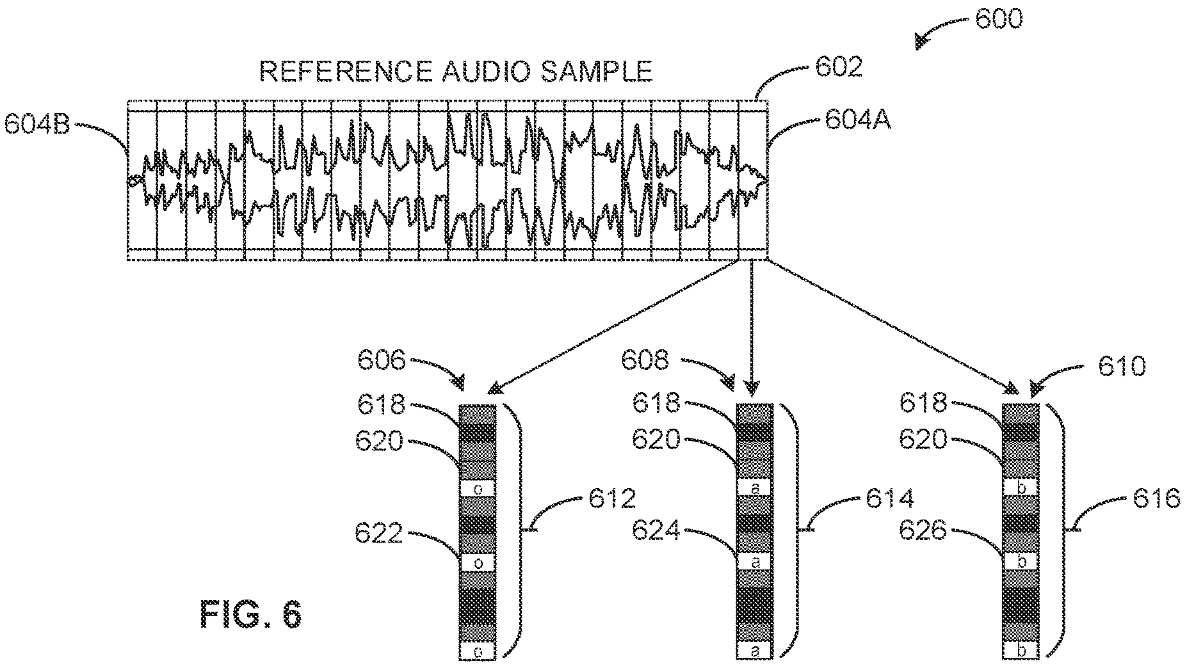
FIG. 6 is an illustration showing the generation of alternative reference fingerprints output by the reference fingerprint generator of FIGS. 1 and 3.

FIG. 6 is an illustration showing an example generation 600 of alternative subfingerprints output by the query fingerprint generator 108 and/or the reference fingerprint generator 120 of FIGS. 1, 2, and/or 3. In the illustrated example of FIG. 6, an example audio signal 602 divided into signal portions including an example first audio signal portion 604A and an example second audio signal portion 604B. In the illustrated example of FIG. 6, the audio signal portion 604A is processed (e.g., by the query fingerprint generator 108, by the reference fingerprint generator 120, etc.) to generate an example primary subfingerprint 606, an example first secondary subfingerprint 608, and an example second secondary subfingerprint 610 having an example first subfingerprint portions 612, an example second subfingerprint portions 614, and an example third subfingerprint portions 616. Each of the primary subfingerprints 606 and first secondary subfingerprint 608, and the second secondary subfingerprint 610 is composed of strong portions (illustrated as black rectangles), neutral portions (illustrated as dot-shaded rectangles), and weak portions (illustrated as white rectangles, etc.). While the illustrated example of FIG. 6 only includes the first secondary subfingerprint 608 and the second secondary subfingerprint 610, in other examples additional subfingerprints can be generated.

The example primary subfingerprint 606 includes (e.g., is composed of, etc.) the example first subfingerprints portions 612. The first subfingerprint portions 612 correspond to the specific time-frequency bins of the first audio signal portion 604A that are energy extrema selected (e.g., by the subfingerprint generator 212 of FIGS. 2 and/or 3, etc.) after the audio signal portion 604A has been normalized. In some examples, each of the first subfingerprint portions 612 is a data structure (e.g., a bit, a byte, etc.) corresponding to the location of the time-frequency bin of the spectrogram selected to form part of the primary subfingerprint 606. In the illustrated example of FIG. 6, the portion strength evaluator 214 of FIGS. 2 and/or 3 has analyzed each of the first subfingerprint portions 612 to determine the strength of each portion of the first subfingerprints portions 612. For example, the portion strength evaluator 214 can overlay white noise onto the audio signal portion 604A and regenerate the subfingerprint. Additionally or alternatively, the portion strength evaluator 214 can append different audio (e.g., white noise, different media, etc.) before or after the audio signal portion 604A. In such examples, the portion strength evaluator 214 can determine which of the first subfingerprint portions 612 are more likely to change in response to different adjacent audio and/or noise (e.g., comparing the percent of changes to a threshold, comparing the number of changes to a threshold, etc.), In the illustrated example of FIG. 6, the portion strength evaluator 214 has identified some of the subfingerprint portions 612 as strong fingerprints, including an example strong subfingerprint portion 618, some of the subfingerprint portions 612 as neutral fingerprints, including an example neutral subfingerprint 620, and some of the subfingerprint portions 612 as weak subfingerprint portions, including an example weak subfingerprint portion 622. In the illustrated example of FIG. 6, the portion replacer 216 replaces the identified weak portions of the subfingerprint portions 612 with alternative subfingerprint portions. In the illustrated example of FIG. 6, the portion replacer 216 has replaced the weak subfingerprint portion 622 with an example first alternative portion 624 to generate the first secondary subfingerprint 608. The portion replacer 216 has replaced the weak subfingerprint portion 622 with an example second alternative portion 626 to generate the second secondary subfingerprint 610. Additionally or alternatively, the portion replacer 216 can replace additional portions of the subfingerprint portions 612 to generate the secondary fingerprints 608, 610. In some examples, the portion replacer 216 can generate additional secondary fingerprints.

If the primary subfingerprint 606, the first secondary subfingerprint 608, and the second secondary subfingerprint 610 are generated by the query fingerprint generator 108, each of the primary subfingerprint 606, the first secondary subfingerprint 608, and the second secondary subfingerprint 610 can be used to generate a fingerprint for the audio signal 602, which can then be compared by the fingerprint comparator 114 to stored reference fingerprints in the reference fingerprint database 116 to identify the audio signal 602. In some examples, the other portions of the audio signal 602 can be similarly processed by the query fingerprint generator 108 to generate alternative subfingerprints for each of those other portions. In other examples, only the boundary segments of the audio signal 602 (e.g., the audio signal portions 604A, 604B) can be processed by query fingerprint generator 108 to generate alternative fingerprints including various combinations of the generated subfingerprints.

If the primary subfingerprint 606, the first secondary subfingerprint 608, and the second secondary subfingerprint 610 are generated by the reference fingerprint generator 120, each of the primary subfingerprint 606, the first secondary subfingerprint 608, and the second secondary subfingerprint 610 can be used to generate a fingerprint for the audio signal 602, which can then be compared by the fingerprint comparator 114 to received query fingerprints. In some examples, the other portions of the audio signal 602 can be similarly processed by the reference fingerprint generator 120 to generate alternative subfingerprints for each of those other portions. In other examples, only the boundary segments of the audio signal 602 (e.g., the audio signal portions 604A, 604B) can be processed by reference fingerprint generator 120 to generate alternative fingerprints including various combinations of the generated subfingerprints. In such examples, each of the alternative fingerprints is stored in the database 116 and can be used to generate the alternative reference. As such employment of the system 100 of FIG. 1 can be used to minimize the matching difficulties arising from the tuning events of FIG. 5B and the channel change events of FIG. 5A.

Figure 7:
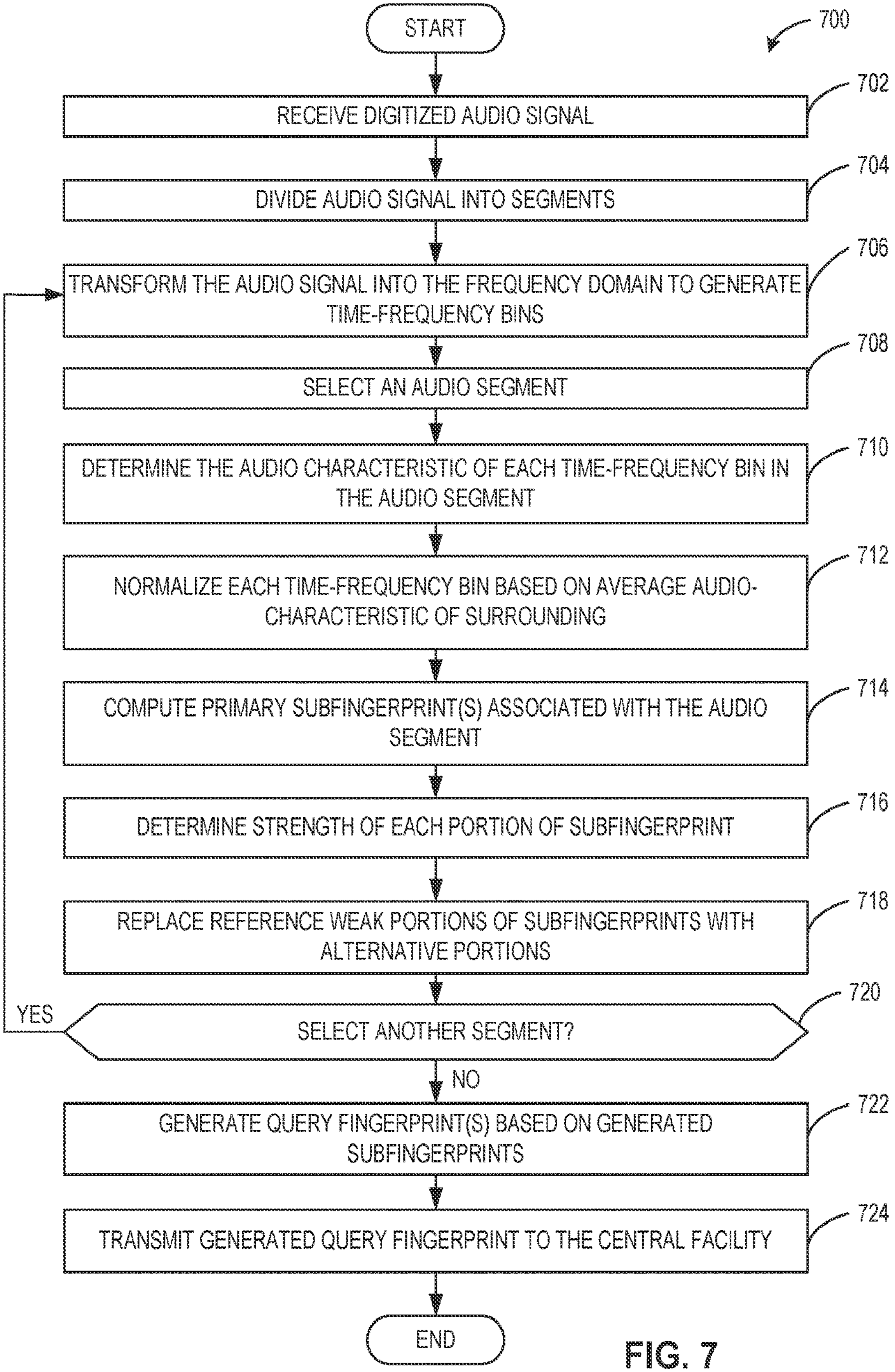
FIG. 7 is a flowchart representative of machine-readable instructions that may be executed to implement the query fingerprint generator of FIGS. 1 and 2.

A flowchart representative of example hardware logic, machine readable instructions, hardware implemented state machines, and/or any combination thereof for implementing the query fingerprint generator 108 of FIG. 2 is shown in FIG. 7. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 9, many other methods of implementing the example query fingerprint generator 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The process 700 of FIG. 7 includes block 702. At block 702, the audio signal interface 202 receives the reference audio signal 118. In some examples, the reference audio signal interface 302 receives a digitized reference audio signal 118 (e.g., actual audio captured by a microphone, transferred over a network, etc.). In other examples, the audio signal interface 202 can request the reference audio signal 118 from a database. In some examples, the audio signal interface 202 can include an analog-to-digital converter to convert the audio into the reference audio signal 118.

At block 704, the audio segmenter 204 divides the reference audio signal 118 into segments. For example, the audio segmenter 204 can divide the reference audio signal 118 into temporal segments corresponding to a length of the reference audio signal 118 associated with a sample (e.g., the period of the reference audio signal 118 corresponding to a subfingerprint, etc.). In some examples, the audio segmenter 204 can segment the reference audio signal 118 into audio segments into corresponding to the length of a time bin (e.g., a frame, etc.).

At block 706, the signal transformer 206 transforms the reference audio signal 118 into the frequency domain to generate time-frequency bins. For example, the signal transformer 206 can transform the portion of the reference audio signal 118 corresponding to the audio segment using a Fast Fourier Transform (FFT). In other examples, the signal transformer 206 can use any other suitable means of transforming the reference audio signal 118 (e.g., discrete Fourier transform, a sliding time window Fourier transform, a wavelet transform, a discrete Hadamard transform, a discrete Walsh Hadamard, a discrete cosine transform, etc.). In some examples, the time-frequency bins generated by the signal transformer 206 and corresponding to the selected audio segment are associated with the intersection of each frequency bin of the reference audio signal 118 and the time bin(s) associated with the audio segment. In some examples, each time-frequency bin generated by the audio segmenter 204 has an associated magnitude value (e.g., a magnitude of the FFT coefficient of the reference audio signal 118 associated with that time-frequency bin, etc.).

At block 708, the audio segmenter 204 selects an audio segment. For example, the audio segmenter 204 can select a first audio segment (e.g., the audio segment corresponding to the beginning of the reference audio signal 118, etc.). In some examples, the audio segmenter 204 can select an audio segment temporally immediately adjacent to a previously selected audio segment. In other examples, the audio segmenter 204 can select an audio segment based on any suitable characteristic. In some examples, the audio segmenter 204 windows the first segment.

At block 710, the audio characteristic determiner 208 determines the audio characteristic of each time-frequency bin in the audio segment. For example, the audio characteristic determiner 208 can determine the magnitude of each time-frequency bin in the audio segment. In such examples, the audio characteristic determiner 208 can calculate the energy and/or the entropy associated with each time-frequency bin. In other examples, the audio characteristic determiner 208 can determine any other suitable audio characteristic(s) (e.g., amplitude, power, etc.).

At block 712, the bin normalizer 210 normalizes each time-frequency bin based on an average audio-characteristic of the surrounding audio region. For example, the bin normalizer 210 can normalize an example time-frequency bin (e.g., the first time-frequency bin 404, etc.) based on the average audio characteristic of the surrounding region (e.g., the first region 406, etc.) as determined during the execution of block 710. In some examples, the bin normalizer generates a normalized spectrogram (e.g., the normalized spectrogram 416 of FIG. 4B, etc.) by normalizing each of the time-frequency bins of the audio segment.

At block 714, the subfingerprint generator 212 computes the primary subfingerprint(s) associated with the audio segment. For example, the subfingerprint generator 212 can generate a subfingerprint based on the normalized values of the time-frequency bins of the previous segment(s) analyzed at block 712. In some examples, the subfingerprint generator 212 generates a subfingerprint by selecting energy and/or entropy extrema (e.g., five extrema, 20 extrema, etc.) in the previous segment(s). In such examples, the subfingerprint generated by the subfingerprint generator 212 includes portions (e.g., bits, etc.) corresponding to each one of the selected extrema. In such examples, each portion of a generated subfingerprint corresponds to the location of an energy extremum. In some examples, the subfingerprint generator 212 does not generate a subfingerprint (e.g., the previous audio segment is not being used to subfingerprint due to down-sampling, etc.). In such examples, blocks 716-820) are not executed for this selected segment.

At block 716, the portion strength evaluator 214 determines the strength of each portion of the generated subfingerprint. For example, the portion strength evaluator 214 can repeat the subfingerprint generator process (e.g., the execution of blocks 710-714, etc.) but overlaying the audio signal with random noise (e.g., white noise, artificially generated background audio, etc.). In some examples, because the subfingerprints associated with each audio sample depend on audio characteristics of adjacent samples, the portion strength evaluator 214 can determine the strength of portions of a subfingerprint by changing the audio characteristics of adjacent audio samples. In some such examples, the portion strength evaluator 214 can replace adjacent audio segments with different audio segments and/or append different audio on the audio segment being analyzed. Additionally or alternatively, the portion strength evaluator 214 can, for some or all samples of the audio signal, replace the adjacent audio samples with different audio (e.g., white noise, artificially generated background audio, different media, etc.). Based on the frequency of the portions of the generated subfingerprints change, the portion strength evaluator 214 can determine the strength of each portion as "weak," "strong." or "neutral." In some examples, the portion strength evaluator 214 can compare the frequency of change to a threshold.

At block 718, the portion replacer 216 replaces reference weak portions of subfingerprints with alternative portions. For example, the portion replacer 216 can replace weak portions of generated subfingerprints with random audio. In such examples, the portion replacer 216 can replace some or all of the identified weak portions with a random portion. For example, the portion replacer 216 can replace the weak portions with audio generated during the operation of the portion strength evaluator 214. In other examples, the portion replace 216 can replace the identified weak portions with any other suitable portion.

At block 720, the audio segmenter 204 determines if another segment is to be selected. For example, the audio segmenter 204 can determine if there are additional audio segments of the reference audio signal 118 that have yet to be analyzed. If another segment is to be selected by the audio segmenter 204, the process 700 returns to block 706. If another segment is not to be selected by the audio segmenter 204, the process 700 advances to block 722.

At block 722, the fingerprint generator 218 generates fingerprint(s) based on generated subfingerprint(s). For example, the fingerprint generator 218 can generate the query fingerprint(s) 110 based on the subfingerprints generated by the subfingerprint generator 212. For example, the fingerprint generator 218 can concatenate the subfingerprints associated with each audio segment into the query fingerprint(s) 110. In some examples, the fingerprint generator 218 can generate a fingerprint including the subfingerprints in which the weak portions have been replaced by the portion replacer 216. In some examples, the fingerprint generator 218 can generate multiple query fingerprints based on the portions of the subfingerprints. In such examples, the fingerprint generator 218 can generate fingerprints including different subfingerprints of which the weak portions have been replaced. In some examples, the portion replacer 216 can be omitted. In some such examples, the fingerprint generator 218 can generate multiple fingerprints based on different audio overlays and/or audio sample appendages. In some such examples, the fingerprint generator 218 can cause the identified weak portions to be included from the query fingerprint 110 when the query fingerprint 110 is compared to reference fingerprints by the fingerprint comparator 114.

At block 724, the fingerprint generator 218 transmits generated query fingerprint(s) 110 to the central facility 112. For example, the fingerprint generator 218 can transmit the generated query fingerprint via the network 111. In other examples, the fingerprint generator 218 can transmit the generated query fingerprint(s) 110 via a wired connection and/or any other suitable connection. The process 700 ends.

Figure 8:
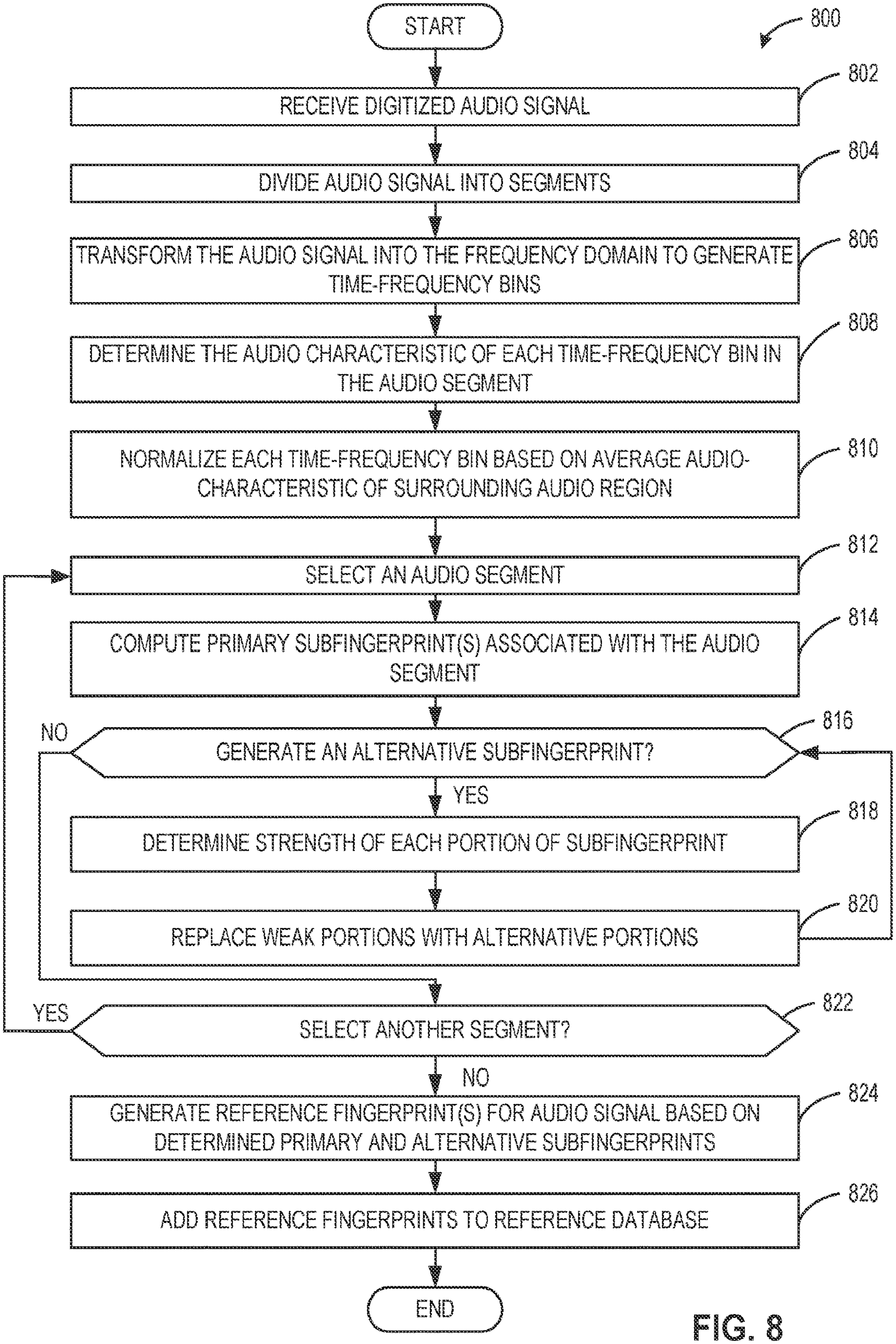
FIG. 8 is a flowchart representative of machine-readable instructions that may be executed to implement the reference fingerprint generator of FIGS. 1 and 3.

A flowchart representative of example hardware logic, machine readable instructions, hardware implemented state machines, and/or any combination thereof for implementing the reference fingerprint generator 120 of FIG. 3 is shown in FIG. 8. The machine readable instructions may be one or more executable programs or portion(s) of an executable program for execution by a computer processor and/or processor circuitry, such as the processor 1012 shown in the example processor platform 900 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 10, many other methods of implementing the example reference fingerprint generator 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The process 800 of FIG. 8 includes block 802. At block 802, the reference audio signal interface 302 receives the digitized audio signal 106. For example, the reference audio signal interface 302 can receive audio (e.g., emitted by the audio source 102 of FIG. 1, etc.) captured by the microphone 104. In this example, the microphone can include an analog to digital converter to convert the audio into a digitized audio signal 106. In other examples, the reference audio signal interface 302 can receive audio stored in a database (e.g., the volatile memory 1014 of FIG. 10, the non-volatile memory 1016 of FIG. 10, the mass storage 1028 of FIG. 10, etc.). In other examples, the digitized audio signal 106 can be transmitted to the reference audio signal interface 302 over a network 111. Additionally or alternatively, the reference audio signal interface 302 can receive the audio signal 106 by any other suitable means.

At block 804, the audio segmenter 204 divides audio signal 106 into segments. For example, the audio segmenter 204 can divide the audio signal 106 into temporal segments corresponding to a length of the audio signal 106 associated with a sample (e.g., the period of the audio signal 106 corresponding to a subfingerprint, etc.). In some examples, the audio segmenter 204 can segment the audio signal 106 into audio segments corresponding to the length of a time bin (e.g., a frame, etc.).

At block 806, the signal transformer 206 transforms the audio signal into the frequency domain to generate time-frequency bins. For example, the signal transformer 206 can transform the portion of the audio signal 106 corresponding to the audio segment using a Fast Fourier Transform (FFT). In other examples, the signal transformer 206 can use any other suitable means of transforming the audio signal 106 (e.g., discrete Fourier transform, a sliding time window Fourier transform, a wavelet transform, a discrete Hadamard transform, a discrete Walsh Hadamard, a discrete cosine transform, etc.). In some examples, the time-frequency bins generated by the signal transformer 206 and corresponding to the selected audio segment are associated with the intersection of each frequency bin of the audio signal 106 and the time bin(s) associated with the audio segment. In some examples, each time-frequency bin generated by the audio segmenter 204 has an associated magnitude value (e.g., a magnitude of the FFT coefficient of the audio signal 106 associated with that time-frequency bin, etc.).

At block 808, the audio characteristic determiner 208 determines the audio characteristic of each time-frequency bin in the audio segment. For example, the audio characteristic determiner 208 can determine the magnitude of each time-frequency bin in the audio segment. In such examples, the audio characteristic determiner 208 can calculate the energy and/or the entropy associated with each time-frequency bin. In other examples, the audio characteristic determiner 208 can determine any other suitable audio characteristic(s) (e.g., amplitude, power, etc.).

At block 810, the bin normalizer 210 normalizes each time-frequency bin based on an average audio-characteristic of the surrounding audio region. For example, the bin normalizer 210 normalizes each time-frequency bin based on an average audio-characteristic of surrounding audio region. For example, the bin normalizer 210 can normalize an example time-frequency bin (e.g., the first time-frequency bin 404, etc.) based on the average audio characteristic of the surrounding region (e.g., the first region 406, etc.) as determined during the execution of block 710. In some examples, the bin normalizer generates a normalized spectrogram (e.g., the normalized spectrogram 416 of FIG. 4B, etc.) by normalizing each of the time-frequency bins of audio segment.

At block 812, the audio segmenter 204 selects an audio segment. For example, the audio segmenter 204 can select a first audio segment (e.g., the audio segment corresponding to the beginning of the audio signal 106, etc.). In some examples, the audio segmenter 204 can select an audio segment temporally immediately adjacent to a previously selected audio segment. In other examples, the audio segmenter 204 can select an audio segment based on any suitable characteristic. In some examples, the audio segmenter windows the first segment.

At block 814, the subfingerprint generator 212 computes primary subfingerprint(s) associated with the audio segment. For example, the subfingerprint generator 212 can generate a subfingerprint based on the normalized values of the time-frequency bins of the previous segment(s) analyzed at block 812. In some examples, the subfingerprint generator 212 generates a subfingerprint by selecting energy and/or entropy extrema (e.g., five extrema, 20 extrema, etc.) in the previous segment(s). In such examples, the subfingerprint generated by the subfingerprint generator 212 includes portions (e.g., bits, etc.) corresponding to each one of the selected extrema. In such examples, each portion of a generated subfingerprint corresponds to the location of an energy extremum. In some examples, the subfingerprint generator 212 does not generate a subfingerprint (e.g., the previous audio segment is not being used to subfingerprint due to down-sampling, etc.). In such examples, blocks 816-720 are not executed for this selected segment.

At block 816, the subfingerprint generator 212 determines if an alternative subfingerprint is to be generated. For example, the subfingerprint generator 212 can determine if a user has requested an alternative subfingerprint be generated. Additionally or alternatively, the subfingerprint generator 212 can determine if an alternative fingerprint is to be generated by any other suitable means. If an alternative subfingerprint is to be generated, the process 800 advances to block 818. If an alternative subfingerprint is not to be generated, the process 800 advances to block 722.

At block 818, the portion strength evaluator 214 determines the strength of each portion of subfingerprint. For example, the portion strength evaluator 214 can repeat the subfingerprint generator process (e.g., the execution of blocks 806-814, etc.) but overlaying the audio signal with random noise (e.g., white noise, artificially generated background audio, etc.). In some examples, because the subfingerprints associated with each audio sample depend on audio characteristics of adjacent samples, the portion strength evaluator 214 can determine the strength of portions of a subfingerprint by changing the audio characteristics of adjacent audio samples. In some such examples, the portion strength evaluator 214 can replace adjacent audio segments with different audio segments and/or append different audio on the audio segment being analyzed. Additionally or alternatively, the portion strength evaluator 214 can, for some or all samples of the audio signal, replace the adjacent audio samples with different audio (e.g., white noise, artificially generated background audio, different media, etc.). Based on the frequency of the portions of the generated subfingerprints change, the portion strength evaluator 214 can determine the strength of each portion as "weak," "strong." or "neutral." In some examples, the portion strength evaluator 214 can compare the frequency of change to a threshold.

At block 820, the portion replacer 216 replaces weak portions with alternative portions. For example, the portion replacer 216 can replace weak portions of generated subfingerprints with random audio. In such examples, the portion replacer 216 can replace some or all of the identified weak portions with a random portion. For example, the portion replacer 216 can replace the weak portions with audio generated during the operation of the portion strength evaluator 214. In other examples, the portion replacer 216 can replace the identified weak portions with any other suitable portion.

At block 822, the audio segmenter 204 determines if another segment is to be selected. For example, the audio segmenter 204 can determine if there are additional audio segments of the audio signal 106 that have yet to be analyzed. If another segment is to be selected by the audio segmenter 204, the process 800 returns to block 812. If another segment is not to be selected by the audio segmenter 204, the process 800 advances to block 824.

At block 824, the reference fingerprint generator 304 generates reference fingerprint(s) 121 for audio signal based on determined primary and alternative subfingerprints. For example, the reference fingerprint generator 304 can generate the reference fingerprint(s) 121 based on the subfingerprints generated by the subfingerprint generator 212. For example, the reference fingerprint generator 304 can concatenate the subfingerprints associated with each audio segment into the reference fingerprint(s) 118. In some examples, the reference fingerprint generator 304 can generate a fingerprint including the subfingerprints in which the weak portions have been replaced by the portion replacer 216. In some examples, the reference fingerprint generator 304 can generate multiple query fingerprints based on the portions of the subfingerprints. In such examples, the reference fingerprint generator 304 can generate fingerprints including different subfingerprints of which the weak portions have been replaced. In some examples, the portion replacer 216 can be omitted. In some such examples, the reference fingerprint generator 304 can generate multiple fingerprints based on different audio overlays and/or audio sample appendages. In some such examples, the reference fingerprint generator 304 can cause the identified weak portions to be included from the query fingerprint 110 when the reference fingerprint 121 is compared to reference fingerprints by the fingerprint comparator 114.

At block 826, the fingerprint generator 218 adds the generated reference fingerprint(s) 121 to the reference fingerprint database 116. For example, the fingerprint generator 218 can transmit and/or transmit the generated reference fingerprint(s) 121 to the reference fingerprint database 116 via a wireless network. In other examples, the fingerprint generator 218 can transfer the generated reference fingerprint(s) to the reference fingerprint database 116 via a wired connection and/or any other suitable means. The process 800 then ends.

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C, (6) B with C, and (7) A with B and with C. As used herein in the context of describing structures, components, items, objects and/or things, the phrase "at least one of A and B" is intended to refer to implementations including any of (1) at least one A. (2) at least one B. and (3) at least one A and at least one B. Similarly, as used herein in the context of describing structures, components, items, objects and/or things, the phrase "at least one of A or B" is intended to refer to implementations including any of (1) at least one A. (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A. (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A. (2) at least one B, and (3) at least one A and at least one B.

As used herein, singular references (e.g., "a." "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 9:
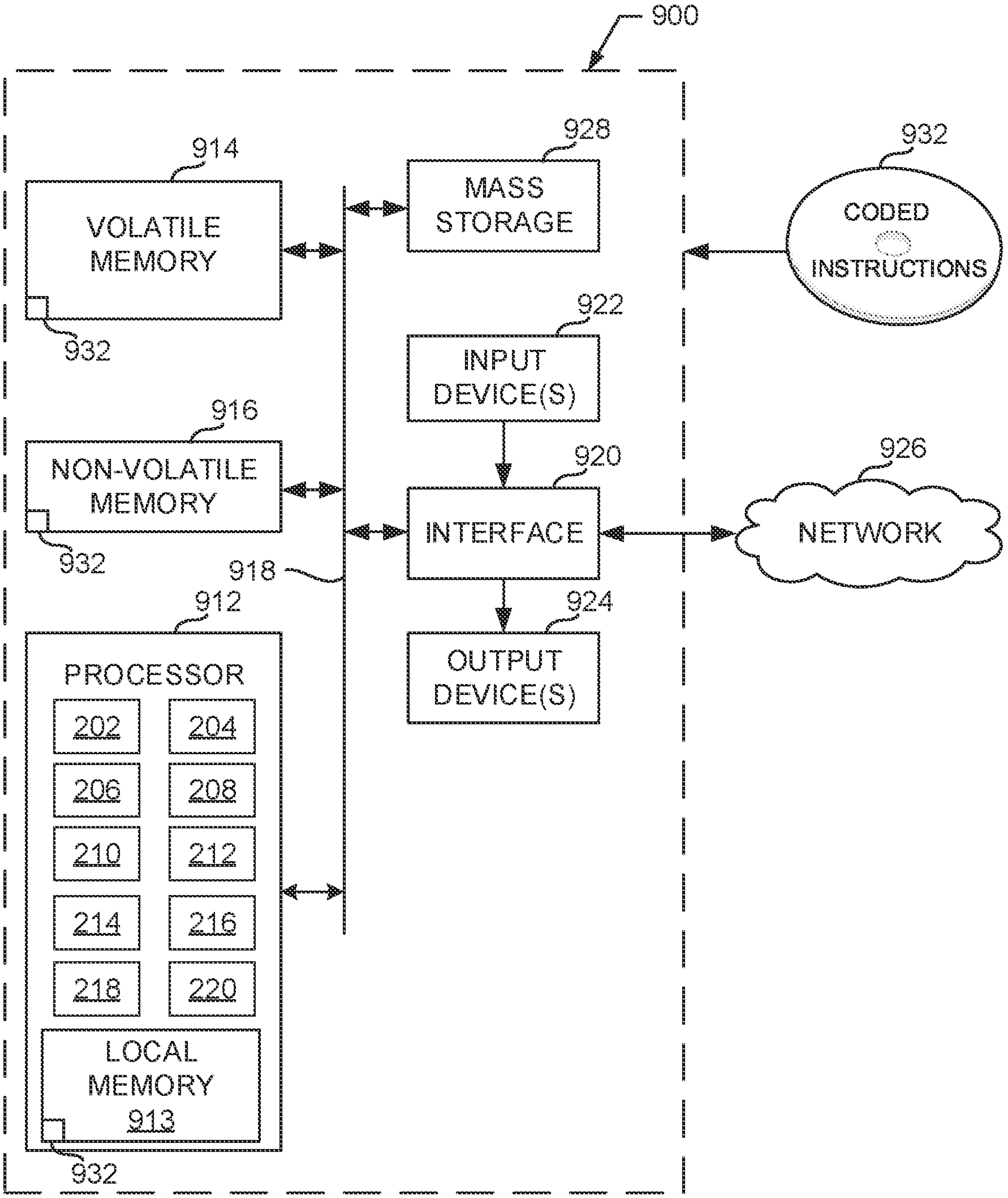
FIG. 9 is a block diagram of an example processing platform structured to execute the instructions of FIG. 7 to implement the reference fingerprint generator of FIGS. 1 and/or 3.

FIG. 9 is a block diagram of an example processor platform 1000 structured to execute the instructions of FIG. 7 to implement the query fingerprint generator 108 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audio signal interface 202, the example audio segmenter 204, the example signal transformer 206, the example audio characteristic determiner 208, the example bin normalizer 210, the example subfingerprint generator 212, the example portion strength evaluator 214, the example portion replacer 216, and the example fingerprint generator 218.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUSR® Dynamic Random Access Memory (RDRAMR®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

Figure 10:
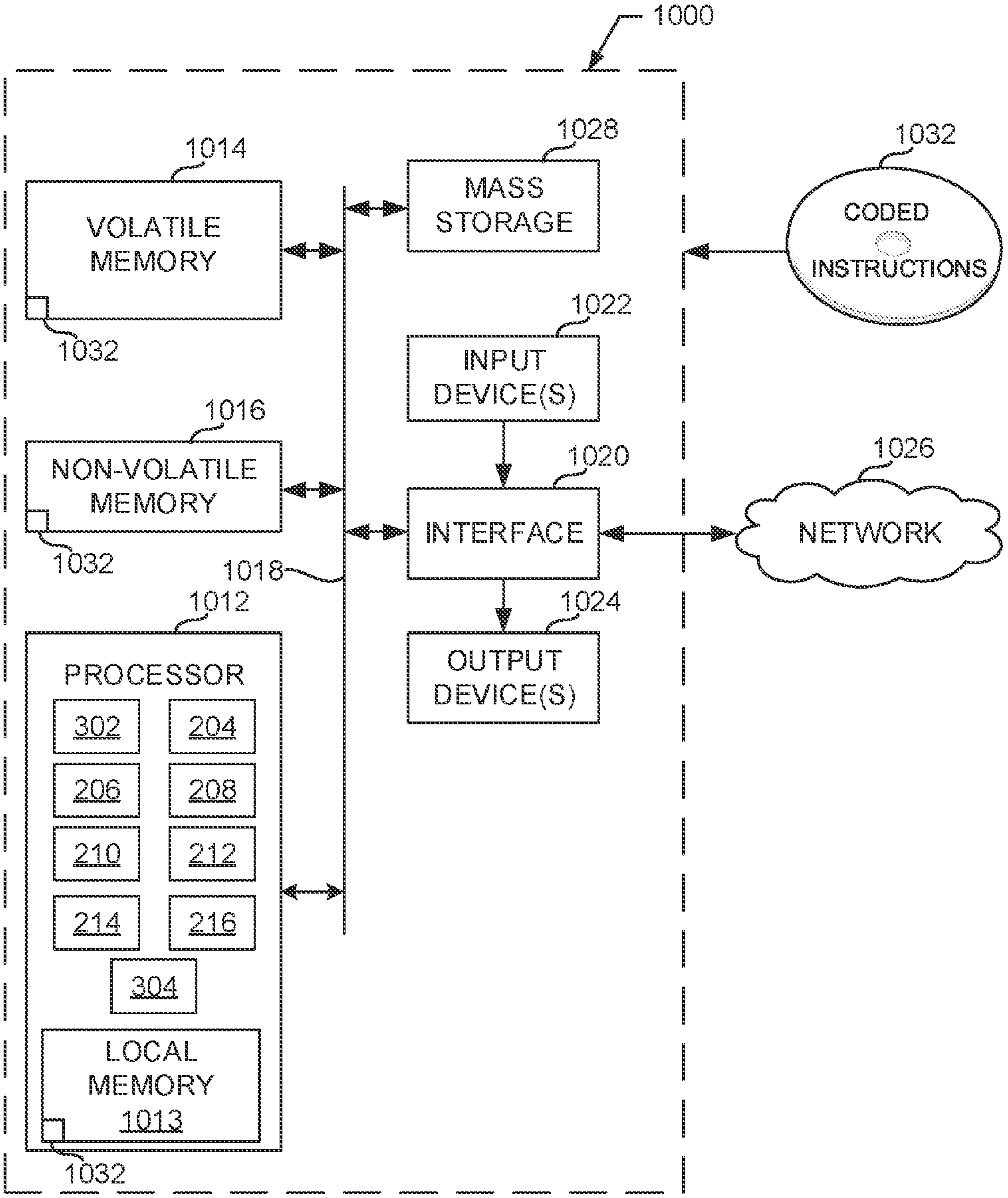
FIG. 10 is a block diagram of an example processing platform structured to execute the instructions of FIG. 8 to implement the query fingerprint generator of FIGS. 1 and/or 3.

FIG. 10 is a block diagram of an example processor platform 1000 structured to execute the instructions of FIG. 8 to implement the reference fingerprint generator 120 of FIG. 9. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the audio signal interface 202, the example audio signal interface 202, the example audio segmenter 204, the example signal transformer 206, the example audio characteristic determiner 208, the example bin normalizer 210, the example subfingerprint generator 212, the example portion strength evaluator 214, the example portion replacer 216, and the reference fingerprint generator 304.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUSR® Dynamic Random Access Memory (RDRAMR®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. may be stored in the mass storage device 1028, in the volatile memory 1014, in the non-volatile memory 1016, and/or on a removable non-transitory computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to fingerprint an audio signal are disclosed herein. Further examples and combinations thereof include the following: Example 1 includes an apparatus comprising an audio segmenter to divide an audio signal into a plurality of audio segments including a first audio segment, a second audio segment temporally after and adjacent to the first audio segment, and a third audio segment temporally after and adjacent to the second audio segment, a bin normalizer to normalize the second audio segment to thereby create a first normalized audio segment, the normalization based on first audio characteristics of the first audio segment, second audio characteristics of the second audio segment, and third audio characteristics the third audio segment, a subfingerprint generator to generate a first subfingerprint from the first normalized audio segment, the first subfingerprint including a first portion corresponding to a location of an energy extremum in the normalized second audio segment, a portion strength evaluator to determine a likelihood of the first portion to change based on changes to at least one of the first audio characteristics, the second audio characteristics, or the third audio characteristics, and a portion replacer to, in response to determining the likelihood does not satisfy a threshold, replace the first portion with a second portion to thereby generate a second subfingerprint.

Example 2 includes the apparatus of example 1, wherein the portion replacer is to, in response to determining the likelihood does not satisfy a strength threshold, exclude the first portion when matching query subfingerprints to the first subfingerprint.

Example 3 includes the apparatus of example 1, further including a signal transformer to transform the audio signal into a frequency domain to thereby generate a first group of time-frequency bins corresponding to the first audio segment, a second group of time-frequency bins corresponding to the second audio segment, and a third group of time-frequency bins corresponding to the third audio segment, and wherein the normalizing of the second audio segment includes normalizing a time-frequency bin of the second group of time-frequency bins based on a surrounding region of time-frequency bins, the surrounding region of time-frequency bins including ones of the first group of time-frequency bins and ones of the second group of time-frequency bins.

Example 4 includes the apparatus of example 1, wherein the portion strength evaluator determines the likelihood based on changes to at least one of the first audio characteristics, the second audio characteristics or the third audio characteristics by replacing the first audio segment with a fourth audio segment, normalizing the second audio segment to thereby create a second normalized audio segment based on second audio characteristics of the fourth audio segment and the third audio segment, generating a second subfingerprint from the normalized second audio segment, and determining if the second subfingerprint includes the first portion.

Example 5 includes the apparatus of example 4, wherein the portion strength evaluator determines the likelihood based on changes to at least one of the first audio characteristics, the second audio characteristics or the third audio characteristics includes replacing the third audio segment with a fifth audio segment, normalizing the second audio segment to thereby create a third normalized audio segment based on third audio characteristics of the first audio segment and the fifth audio segment, generating a third subfingerprint from the third normalized audio segment, and determining if the second subfingerprint includes the first portion.

Example 6 includes the apparatus of example 5, wherein at least one of the fourth audio segment or the fifth audio segment is randomly generated noise audio.

Example 7 includes the apparatus of example 4, further including a fingerprint generator to store the first subfingerprint and the second subfingerprint to enable matching query subfingerprints to at least one of the first subfingerprint or the second subfingerprint to thereby identify the audio signal.

Example 8 includes a method comprising dividing an audio signal into a plurality of audio segments including a first audio segment, a second audio segment temporally after and adjacent to the first audio segment, and a third audio segment temporally after and adjacent to the second audio segment, normalizing the second audio segment to thereby create a first normalized audio segment, the normalization based on first audio characteristics of the first audio segment, second audio characteristics of the second audio segment, and third audio characteristics the third audio segment, generating a first subfingerprint from the first normalized audio segment, the first subfingerprint including a first portion corresponding to a location of an energy extremum in the normalized second audio segment, determining a likelihood of the first portion to change based on changes to at least one of the first audio characteristics, the second audio characteristics, or the third audio characteristics, and in response to determining the likelihood does not satisfy a threshold, replacing the first portion with a second portion to thereby generate a second subfingerprint.

Example 9 includes the method of example 8, further including, in response to determining the likelihood does not satisfy a strength threshold, excluding the first portion when matching query subfingerprints to the first subfingerprint.

Example 10 includes the method of example 8, further including transforming the audio signal into a frequency domain to thereby generate a first group of time-frequency bins corresponding to the first audio segment, a second group of time-frequency bins corresponding to the second audio segment, and a third group of time-frequency bins corresponding to the third audio segment, and wherein the normalizing the second audio segment includes normalizing a time-frequency bin of the second group of time-frequency bins based on a surrounding region of time-frequency bins, the surrounding region of time-frequency bins including ones of the first group of time-frequency bins and ones of the second group of time-frequency bins.

Example 11 includes the method of example 8, wherein the determination of the likelihood based on changes to at least one of the first audio characteristics, the second audio characteristics or the third audio characteristics includes replacing the first audio segment with a fourth audio segment, normalizing the second audio segment to thereby create a second normalized audio segment based on second audio characteristics of the fourth audio segment and the third audio segment, generating a second subfingerprint from the normalized second audio segment, and determining if the second subfingerprint includes the first portion.

Example 12 includes the method of example 11, wherein the determination of the likelihood based on changes to at least one of the first audio characteristics, the second audio characteristics or the third audio characteristics includes replacing the third audio segment with a fifth audio segment, normalizing the second audio segment to thereby create a third normalized audio segment based on third audio characteristics of the first audio segment and the fifth audio segment, generating a third subfingerprint from the third normalized audio segment, and determining if the second subfingerprint includes the first portion.

Example 13 includes the method of example 11, further including storing the first subfingerprint and the second subfingerprint to enable matching query subfingerprints to at least one of the first subfingerprint or the second subfingerprint to thereby identify the audio signal.

Example 14 includes a non-transitory computer readable medium comprising instructions which, when executed, cause a processor to divide an audio signal into a plurality of audio segments including a first audio segment, a second audio segment temporally after and adjacent to the first audio segment, and a third audio segment temporally after and adjacent to the second audio segment, normalize the second audio segment to thereby create a first normalized audio segment, the normalization based on first audio characteristics of the first audio segment, second audio characteristics of the second audio segment, and third audio characteristics the third audio segment, generate a first subfingerprint from the first normalized audio segment, the first subfingerprint including a first portion corresponding to a location of an energy extremum in the normalized second audio segment, determine a likelihood of the first portion to change based on changes to at least one of the first audio characteristics, the second audio characteristics, or the third audio characteristics, and in response to determining the likelihood does not satisfy a threshold, replace the first portion with a second portion to thereby generate a second subfingerprint.

Example 15 includes the non-transitory computer readable medium of example 14, wherein the instructions further cause the processor to, in response to determining the likelihood does not satisfy a strength threshold, excluding the first portion when matching query subfingerprints to the first subfingerprint.

Example 16 includes the non-transitory computer readable medium of example 14, wherein the instructions further cause the processor to transform the audio signal into a frequency domain to thereby generate a first group of time-frequency bins corresponding to the first audio segment, a second group of time-frequency bins corresponding to the second audio segment, and a third group of time-frequency bins corresponding to the third audio segment, and wherein the normalizing the second audio segment includes normalizing a time-frequency bin of the second group of time-frequency bins based on a surrounding region of time-frequency bins, the surrounding region of time-frequency bins including ones of the first group of time-frequency bins and ones of the second group of time-frequency bins.

Example 17 includes the non-transitory computer readable medium of example 14, wherein the determination of the likelihood based on changes to at least one of the first audio characteristics, the second audio characteristics or the third audio characteristics includes replacing the first audio segment with a fourth audio segment, normalizing the second audio segment to thereby create a second normalized audio segment based on second audio characteristics of the fourth audio segment and the third audio segment, generating a second subfingerprint from the normalized second audio segment, and determining if the second subfingerprint includes the first portion.

Example 18 includes the non-transitory computer readable medium of example 17, wherein the determination of the likelihood based on changes to at least one of the first audio characteristics, the second audio characteristics or the third audio characteristics includes replacing the third audio segment with a fifth audio segment, normalizing the second audio segment to thereby create a third normalized audio segment based on third audio characteristics of the first audio segment and the fifth audio segment, generating a third subfingerprint from the third normalized audio segment, and determining if the second subfingerprint includes the first portion.

Example 19 includes the non-transitory computer readable medium of example 18, wherein at least one of the fourth audio segment or the fifth audio segment is randomly generated noise audio.

Example 20 includes the non-transitory computer readable medium of example 18, wherein the instructions further cause the processor to store the first subfingerprint and the second subfingerprint to enable matching query subfingerprints to at least one of the first subfingerprint or the second subfingerprint to thereby identify the audio signal. The following claims are hereby incorporated into this Detailed Description by this reference, with each claim standing on its own as a separate embodiment of the present disclosure.

What is claimed is:

1. A non-transitory computer readable medium comprising instructions which, when executed, cause one or more processors to:

divide an audio signal into a plurality of audio segments, wherein the plurality of audio segments comprises a first audio segment, a second audio segment, and a third audio segment;

normalize the second audio segment to create a first normalized audio segment based on first audio characteristics of the first audio segment and second audio characteristics of the second audio segment and a second normalized audio segment based on third audio characteristics of the third audio segment and at least one of the first audio characteristics of the first audio segment and the second audio characteristics of the second audio segment;

generate a first subfingerprint from the first normalized audio segment, wherein the first subfingerprint comprises a first portion corresponding to a location of an energy extremum in the normalized second audio segment, and a second subfingerprint from the second normalized audio segment;

determine a likelihood of the first portion to change based on changes to at least one of the first audio characteristics, the second audio characteristics, and the third audio characteristics;

in response to determining the likelihood does not satisfy a threshold, replace the first portion with a second portion; and determine if the second subfingerprint includes the first portion.

2. The non-transitory computer readable medium of claim 1, wherein the instructions further comprise, in response to determining the likelihood does not satisfy a threshold, excluding the first portion when matching query subfingerprints to at least one of the first subfingerprint and second subfingerprint.

3. The non-transitory computer readable medium of claim 1, wherein the instructions further comprise transforming the audio signal into a frequency domain to thereby generate a first group of time-frequency bins corresponding to the first audio segment, a second group of time-frequency bins corresponding to the second audio segment, and a third group of time-frequency bins corresponding to the third audio segment.

4. The non-transitory computer readable medium of claim 3, wherein normalizing of the second audio segment includes normalizing a time-frequency bin of the second group of time-frequency bins based on a surrounding region of time-frequency bins.

5. The non-transitory computer readable medium of claim 4, wherein the surrounding region of time-frequency bins include at least one of the first group of time-frequency bins and the second group of time-frequency bins.

6. The non-transitory computer readable medium of claim 1, wherein determining the likelihood of the first portion to change based on changes to at least one of the first audio characteristics, the second audio characteristics, and the third audio characteristics further comprises:

replacing the second audio segment with a fourth audio segment; and normalizing the second audio segment to create a third normalized audio segment based on third audio characteristics of the first audio segment and the fourth audio segment.

7. The non-transitory computer readable medium of claim 6, wherein determining the likelihood of the first portion to change based on changes to at least one of the first audio characteristics, the second audio characteristics, and the third audio characteristics further comprises:

generating a third subfingerprint from the third normalized audio segment; and determining if the second subfingerprint includes the first portion.

8. The non-transitory computer readable medium of claim 6, wherein the fourth audio segment is randomly generated noise audio.

9. The non-transitory computer readable medium of claim 1, wherein the instructions further comprise storing the first subfingerprint and the second subfingerprint in a database, and wherein storing the first subfingerprint and the second subfingerprint in a database enables matching of query subfingerprints to at least one of the first subfingerprint or the second subfingerprint to identify the audio signal.

10. The non-transitory computer readable medium of claim 1, wherein the second audio segment is temporally after and adjacent to the first audio segment.

11. The non-transitory computer readable medium of claim 1, wherein the third audio segment is temporally after and adjacent to at least one of the first audio segment and the second audio segment.

12. A computer-implemented method comprising:

dividing an audio signal into a plurality of audio segments, wherein the plurality of audio segments comprises a first audio segment, a second audio segment, and a third audio segment;

normalizing the second audio segment to create a first normalized audio segment based on first audio characteristics of the first audio segment and second audio characteristics of the second audio segment and a second normalized audio segment based on third audio characteristics of the third audio segment and at least one of the first audio characteristics of the first audio segment and the second audio characteristics of the second audio segment;

generating a first subfingerprint from the first normalized audio segment, wherein the first subfingerprint comprises a first portion corresponding to a location of an energy extremum in the normalized second audio segment, and a second subfingerprint from the second normalized audio segment;

determining a likelihood of the first portion to change based on changes to at least one of the first audio characteristics, the second audio characteristics, and the third audio characteristics;

in response to determining the likelihood does not satisfy a threshold, replacing the first portion with a second portion; and determining if the second subfingerprint includes the first portion.

13. The method of claim 12, wherein the method further comprises, in response to determining the likelihood does not satisfy a threshold, excluding the first portion when matching query subfingerprints to at least one of the first subfingerprint and second subfingerprint.

14. The method of claim 12, wherein the method further comprises transforming the audio signal into a frequency domain to thereby generate a first group of time-frequency bins corresponding to the first audio segment, a second group of time-frequency bins corresponding to the second audio segment, and a third group of time-frequency bins corresponding to the third audio segment.

15. The method of claim 14, wherein normalizing of the second audio segment includes normalizing a time-frequency bin of the second group of time-frequency bins based on a surrounding region of time-frequency bins.

16. The method of claim 15, wherein the surrounding region of time-frequency bins include at least one of the first group of time-frequency bins and the second group of time-frequency bins.

17. The method of claim 12, wherein the method further comprises storing the first subfingerprint and the second subfingerprint in a database, and wherein storing the first subfingerprint and the second subfingerprint in a database enables matching of query subfingerprints to at least one of the first subfingerprint or the second subfingerprint to identify the audio signal.

18. The method of claim 12, wherein the second audio segment is temporally after and adjacent to the first audio segment.

19. The method of claim 12, wherein the third audio segment is temporally after and adjacent to at least one of the first audio segment and the second audio segment.

20. A computing device comprising:

one or more processors; and non-transitory computer readable medium comprising instructions which, when executed, cause the one or more processors to:

divide an audio signal into a plurality of audio segments, wherein the plurality of audio segments comprises a first audio segment, a second audio segment, and a third audio segment;

normalize the second audio segment to create a first normalized audio segment based on first audio characteristics of the first audio segment and second audio characteristics of the second audio segment and a second normalized audio segment based on third audio characteristics of the third audio segment and at least one of the first audio characteristics of the first audio segment and the second audio characteristics of the second audio segment;

generate a first subfingerprint from the first normalized audio segment, wherein the first subfingerprint comprises a first portion corresponding to a location of an energy extremum in the normalized second audio segment, and a second subfingerprint from the second normalized audio segment;

determine a likelihood of the first portion to change based on changes to at least one of the first audio characteristics, the second audio characteristics, and the third audio characteristics;

in response to determining the likelihood does not satisfy a threshold, replace the first portion with a second portion; and determine if the second subfingerprint includes the first portion.

* * * * *